April 9, 1946.  E. P. WORTHEN ET AL  2,398,068
APPARATUS FOR EVAPORATING AND DISTILLING
Filed March 22, 1945  10 Sheets-Sheet 1

Inventors
Eugene P. Worthen
and Fehner S. Barbour.
By R. S. A. Dougherty.
Attorney April 9, 1946.  E. P. WORTHEN ET AL  2,398,068
APPARATUS FOR EVAPORATING AND DISTILLING
Filed March 22, 1945  10 Sheets-Sheet 5

Inventors
Eugene P. Worthen
and Fenner S. Barbour
By R. S. A. Dougherty
Attorney April 9, 1946. E. P. WORTHEN ET AL 2,398,068
APPARATUS FOR EVAPORATING AND DISTILLING
Filed March 22, 1945   10 Sheets-Sheet 7

Inventors
Eugene P. Worthen
and Fenner S. Barbour
By R. S. A. Dougherty
Attorneys April 9, 1946.  E. P. WORTHEN ET AL  2,398,068
APPARATUS FOR EVAPORATING AND DISTILLING
Filed March 22, 1945  10 Sheets-Sheet 9

Inventors
Eugene P. Worthen
and Fenner S. Barbour.
By R. S. A. Dougherty
Attorney

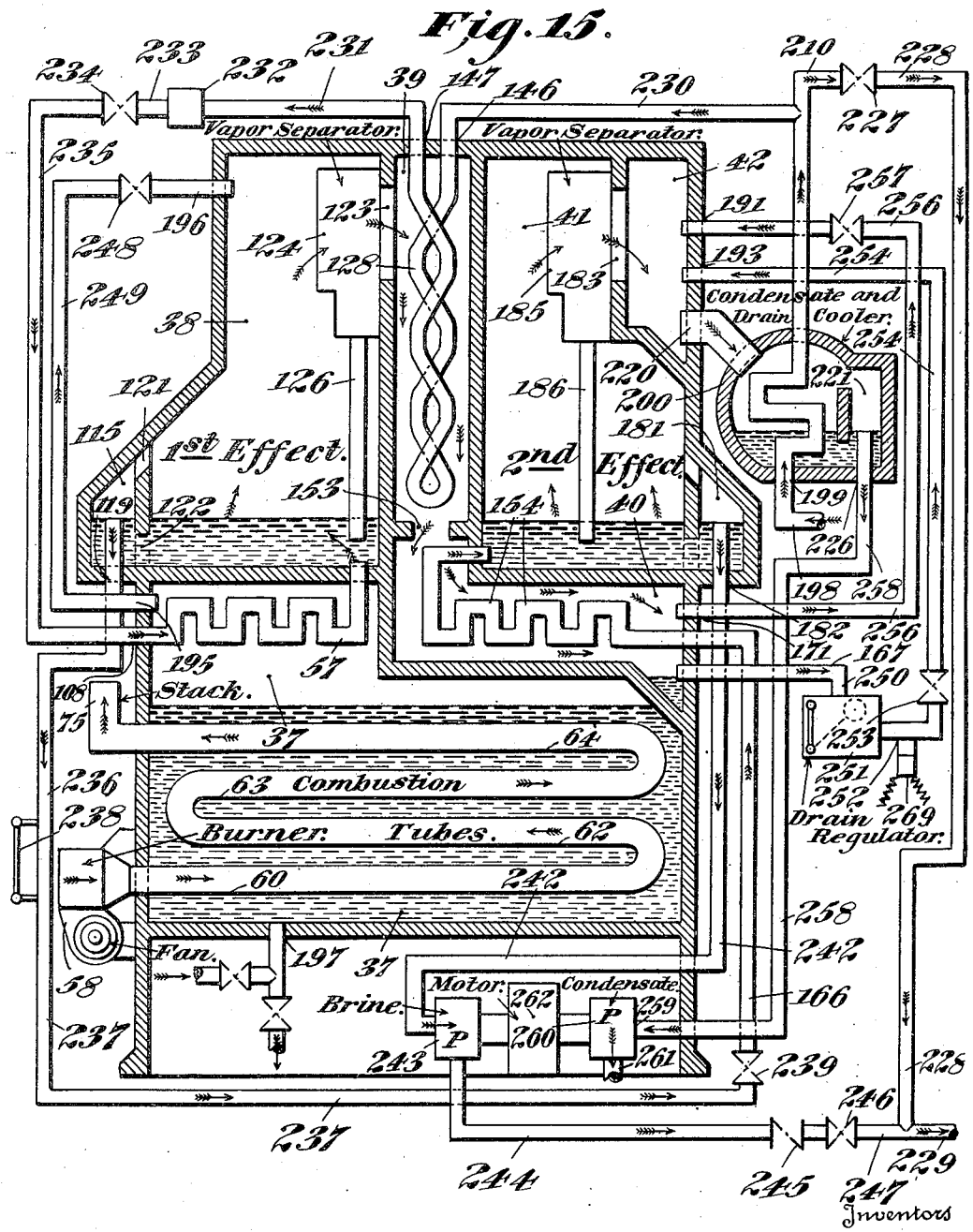

Patented Apr. 9, 1946

2,398,068

UNITED STATES PATENT OFFICE 2,398,068

APPARATUS FOR EVAPORATING AND DISTILLING

Eugene Porter Worthen, Braintree, and Fenner Smith Barbour, Wollaston, Mass., assignors, by mesne assignments, to Buena Vista Iron Company, a corporation of New Jersey Application March 22, 1945, Serial No. 584,176

17 Claims. (Cl. 202—174)

This invention relates to an improved self-contained apparatus for evaporating and distilling. It relates more especially to oil or gas fired distilling plants for use on board ships and in isolated localities where it is necessary to supply fresh or pure water demands from salt or contaminated water. It is especially useful where a supply of natural fresh water is not available and in addition thereto there is not readily available a source of steam heat suitable for initiating evaporation in a plural effect evaporating and distilling plant.

This invention relates more particularly to changes and improvements in the means for the production of pure water in evaporating and distilling apparatus that are disclosed in the co-pending patent application Serial No. 551,752, filed August 29, 1944, by Eugene Porter Worthen and Benjamin Fox.

The said co-pending application Serial No. 551,752 shows and discloses a small low pressure, single effect, oil or gas fired, evaporating and distilling plant more especially adapted for specific uses as are set forth therein. In the present case the effort has been to achieve additional economy and capacity for equivalent weight and space requirements of the evaporating and distilling plant by adapting the single effect design for plural effect evaporation and distillation. This effort has been rewarded by obtaining from the present design approximately twice the fresh water output for the same quantity of fuel burned with only a slight increase in size.

Therefore it is an especial object of our invention to provide a low pressure, plural effect, oil or gas fired, evaporating and distilling plant that combines in a single compact unit three primary units—an oil or gas fired boiler, a first effect evaporator, and a second effect evaporator, and supplementary thereto the various essential elements required for the evaporating and distilling of salt or contaminated water.

The boiler is a special feature of our invention. Using submerged fire tubes it generates steam from fresh water within the boiler in a closed circuit requiring no make-up water and no feed pump. The fire tubes submerged in the boiler water are supplied with the hot products of combustion from an external oil or gas fired burner. The generated steam within the boiler rises and contacts the exterior surfaces of the first effect evaporator tubes exposed within the boiler whereby the boiler steam is condensed on the outside surfaces of said evaporator and transfers therefrom the heat of the hot products of combustion to the contaminated or salt water within the first effect evaporator tubes. By this arrangement the hot products of combustion are prevented from contacting the evaporator tubes and thus prevents the rapid formation of salt scale that would otherwise soon make the evaporating plant inoperative. A further feature of our boiler design is the use of inclined evaporator tubes, and in conjunction therewith having a removable cover plate over one end of said tubes whereby any salt scale that does accumulate within the said tubes may be readily removed by removing the said cover plate and turbining the tubes with any standard, turbine driven, rotary, tube cleansing elements.

Other objects of our invention is to so arrange the essential elements of our first effect evaporator unit and of our second effect evaporator unit, that the vapor generated by the boiling of the salt or contaminated water within the first effect evaporator flows directly and sequentially through intercommunicating chambers of the first and second effect evaporators without the use of external piping, and that the said vapor is brought into contact with and condenses on the exterior surfaces of the inclined evaporator tubes of the second effect evaporator. By this sequential and cooperating relationship of entirely internal intercommunicating chambers for the flow of vapor from the first effect evaporator to the second effect evaporator a gain of economy and efficiency of operation is brought about, together with a saving in weight and space by reason of its compactness of design.

A further object of our invention is the provision of means for combining the generated vapors and their condensates of both the first effect and of the second effect in a single compartment prior to final condensation and removal as the finished product of the apparatus. It is known to those skilled in the art that the usual arrangement in a double effect water distilling plant is to have the second effect evaporator tube nest drains (which are the condensed vapors generated in the first effect evaporator) discharge to an external flash chamber wherein their pressure and temperature are reduced to that of the second effect distilling condenser. The second effect distilling condenser also discharges its drains to the flash chamber and the combined product is withdrawn by a condensate pump and discharged through a separate external condensate cooler. In the process of reducing the second effect tube nest drains to the temperature and pressure of the distilling condenser, a portion of them (about 3 to 5%) vaporize or "flash." This flash vapor passes through a vapor pipe from the top of the flash chamber to the distilling condenser where it is recondensed. In our improved arrangement a collecting chamber is provided which receives the purified vapors from the second effect separator (those which are generated in the second effect evaporator) and the drains from the second effect tube nest (which are the condensed vapors generated in the first effect evaporator), and then the combined vapors and drains, including any flash vapor released during the reduction in temperature and pressure of the drains, are passed to a combined distilling condenser and condensate cooler wherein the condensate is cooled considerably below the vapor temperature before it enters the combined condensate and vacuum air extraction pump. This results in a reduction of the number of separate heat exchangers required, and in having a single point of discharge of the product of the apparatus at the apparatus.

Further objects and advantages will be apparent from the following description wherein details of design and operation will be given in full with reference to the accompanying drawings illustrating the preferred embodiment of our invention and wherein similar reference numerals designate similar parts throughout the several views.

Fig. 15 is a drawing representing in diagrammatic form the flow system of the liquids to be distilled, of the heating fluids thereof, and of the condensate collecting means in an evaporating and distilling apparatus embodying our invention.

Figure 1:
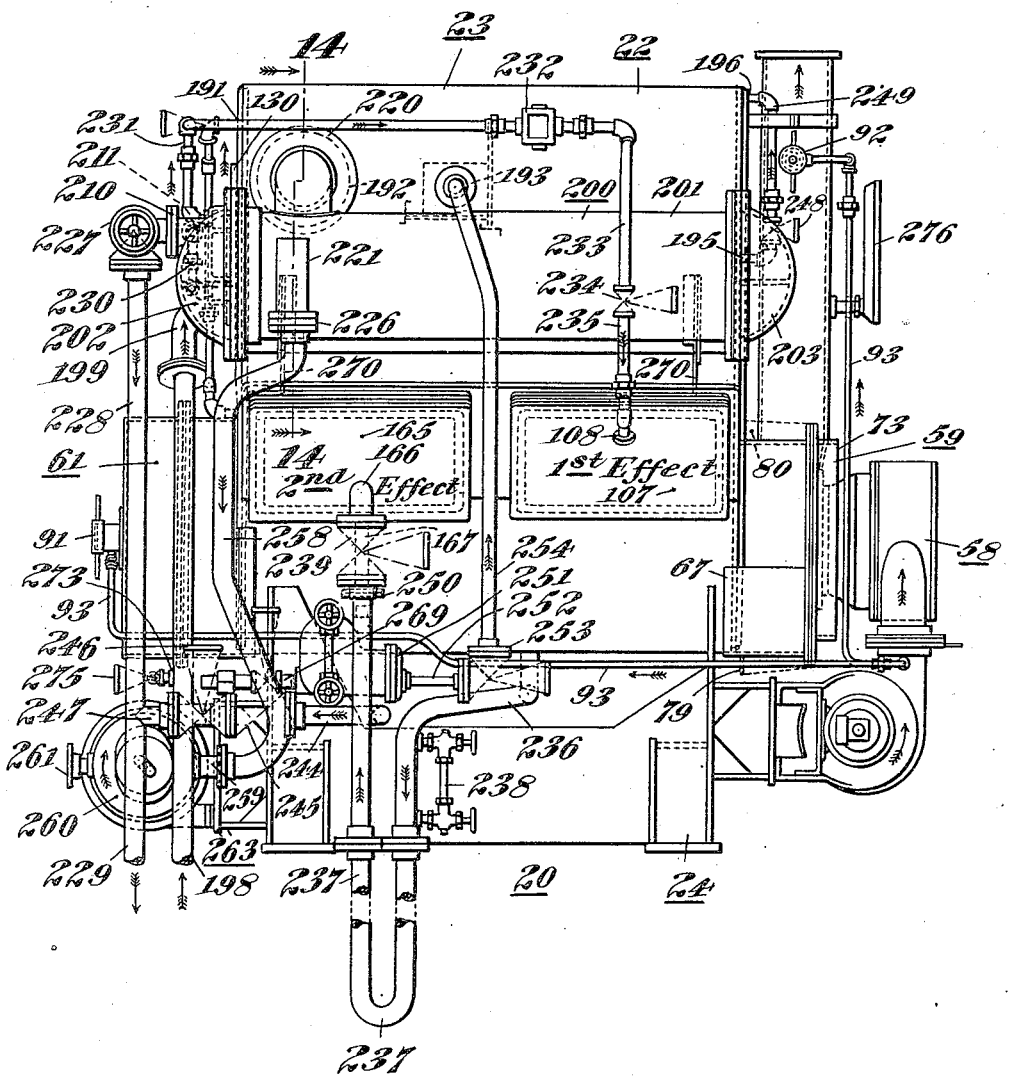
Fig. 1 is a side elevation of our improved apparatus.

Referring now to the drawings, and more particularly to Figures 5 to 14, inclusive, the numeral 20 designates the complete ensemble comprising a plurality of individual effects of a so-called multi-effect evaporating and distilling apparatus. The drawings show a multi-effect evaporating and distilling apparatus 20 comprising a boiler 21, a first effect 22, a second effect 23, and a supporting pedestal 24. The number of effects may be increased as is well known in the art, depending upon the degree of efficiency or of production desired, as long as the addition of an effect, or effects, occurs between units equivalent to the first and second effects herein shown.

The apparatus 20 comprises a casing 25 preferably fabricated by welding together metal plates into a single unitary structure. This casing 25 acts as the mounting structure for the elements of the boiler 21, the first effect 22, the second effect 23, and those supported on the pedestal 24.

Figure 6:
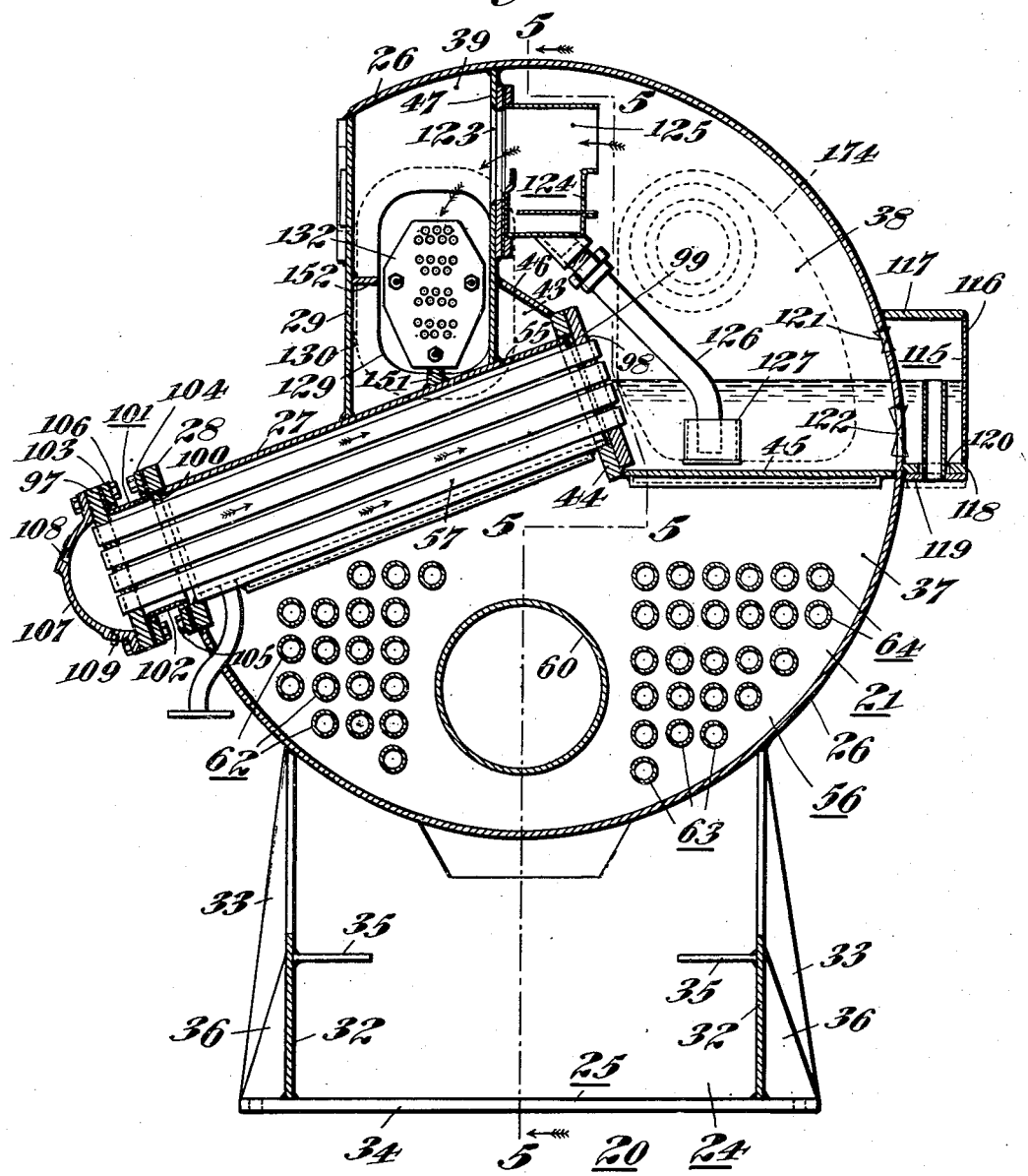
Fig. 6 is a section taken along the line 6—6 of Fig. 5 as viewed in the direction of the arrows.
Figure 7:
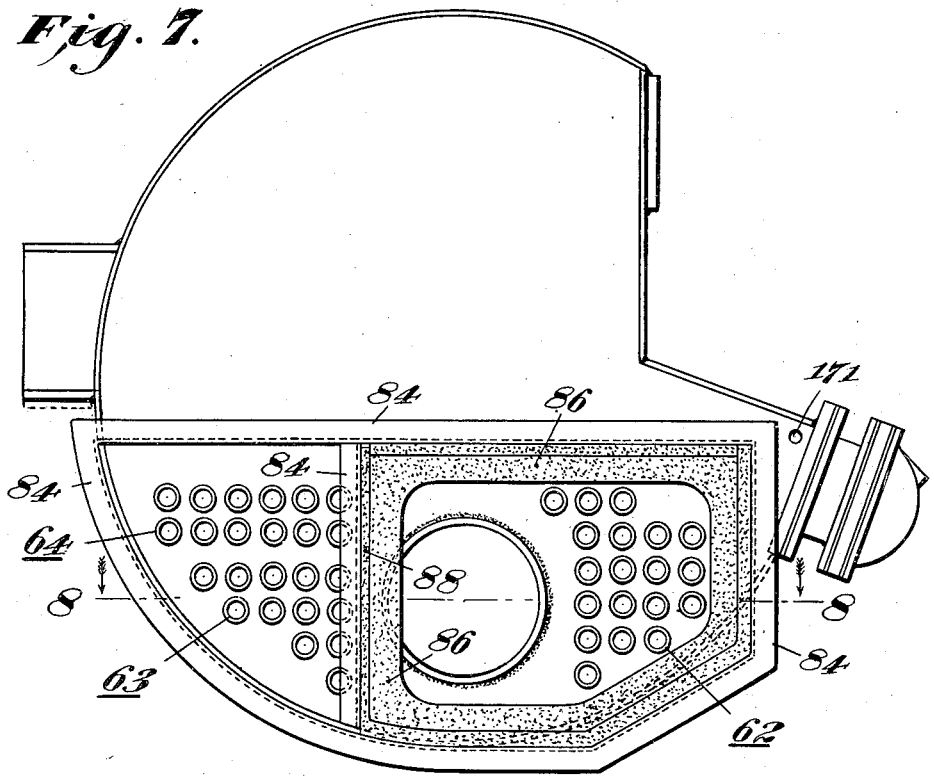
Fig. 7 is a detail elevation of the second effect end with fire box cover removed.
Figure 8:
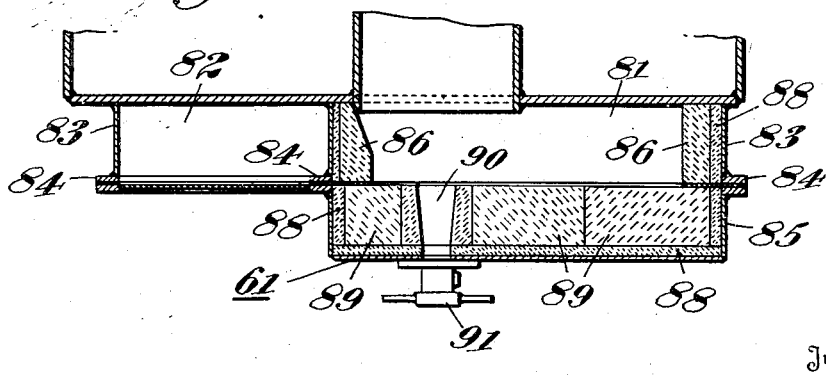
Fig. 8 is a section taken along the line 8—8 of Fig. 7 as viewed in the direction of the arrows.
Figure 9:
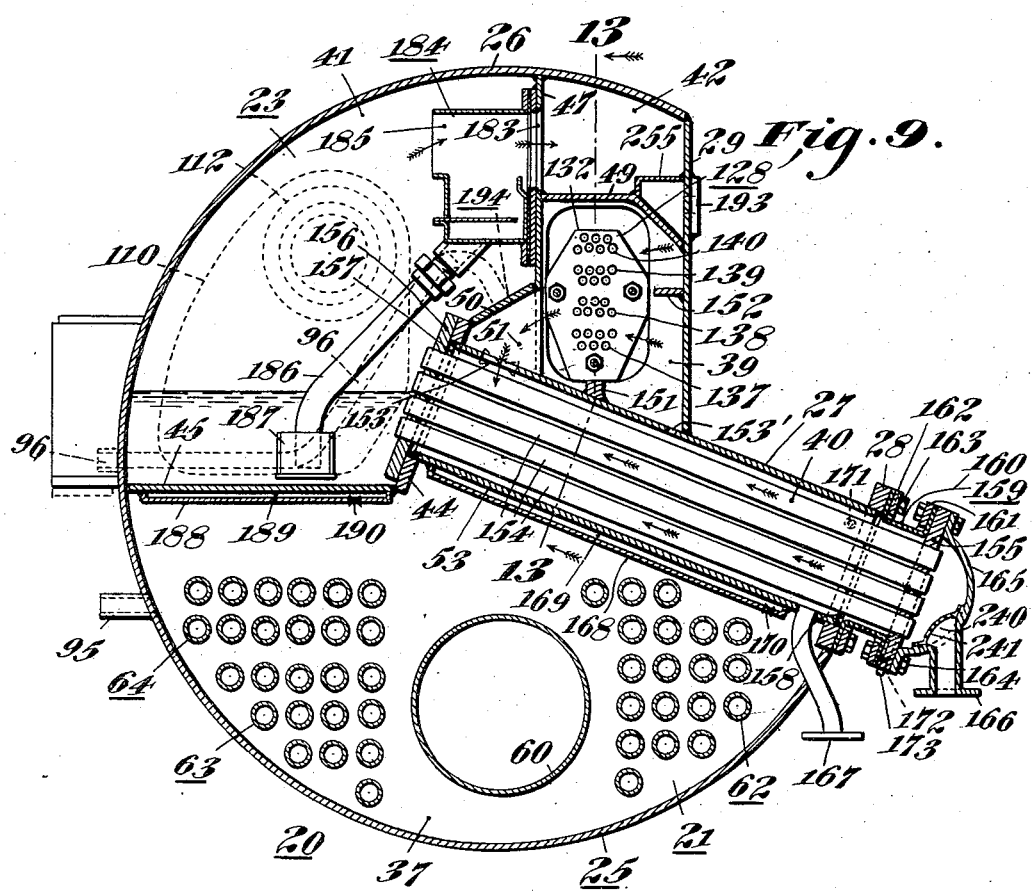
Fig. 9 is a section taken along the line 9—9 of Fig. 5 with the pedestal removed as viewed in the direction of the arrows.
Figure 10:
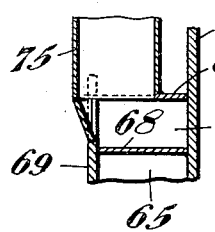
Fig. 10 is a detail section taken along the line 10—10 of Fig. 4 as viewed in the direction of the arrows.
Figure 11:
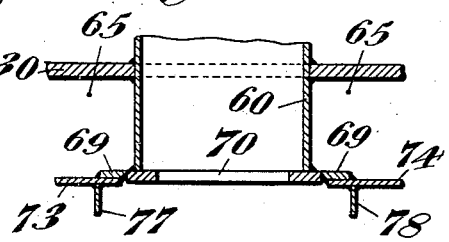
Fig. 11 is a detail section taken along the line 11—11 of Fig. 4 as viewed in the direction of the arrows.
Figure 12:
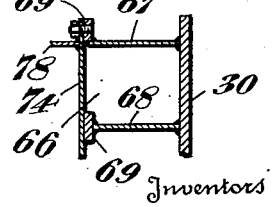
Fig. 12 is a detail section taken along the line 12—12 of Fig. 4 as viewed in the direction of the arrows.

That part of the casing 25 comprising the mounting structure for the boiler 21, the first effect 22, and the second effect 23 is, as may be noted particularly in Figures 6 and 9, substantially cylindrical except for an off-center segment along one side of the top half thereof, and is comprised of the wrapper plate 26, the evaporator top plate 27, the evaporator outer support plate 28, the feed heater outer wall plate 29, the first effect end plate 30, and the second effect end plate 31.

Figure 5:
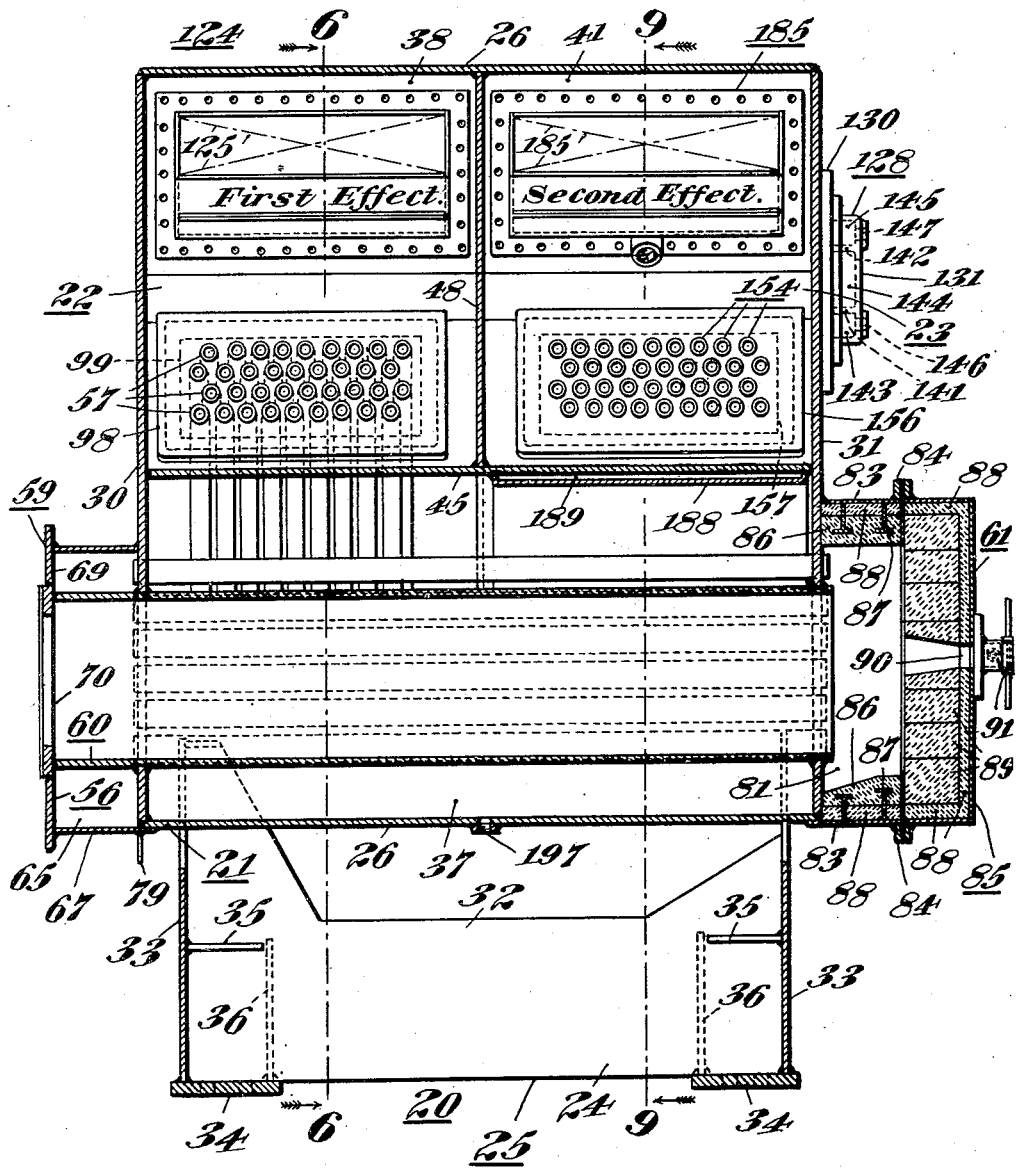
Fig. 5 is a section taken along the line 5—5—5—5—5 of Fig. 6 as viewed in the direction of the arrows.

That part of the casing 25 comprising the pedestal 24, as may be noted particularly in Figures 5, 6, and 9, is substantially a rectangular box-like structure comprised of the longitudinal support plates 32, the end plates 33, the base plates 34, the inside corner brackets 35, and the vertical brace plates 36. The base plates 34 are provided with bolt-holes for foundation bolts (not shown).

The main substantially cylindrical portion of the casing 25 is divided internally into seven distinct compartments as follows: the boiler compartment 37, the first effect evaporator vapor compartment 38, the vapor feed heater compartment 39, the second effect evaporator tube compartment 40, the second effect evaporator vapor compartment 41, the second effect evaporator vapor discharge compartment 42, and the boiler water gauge and vent communicating duct 43.

The boiler compartment 37 extends full length and full width of the casing 25—occupying substantially the lower half of the cylindrical portion thereof. It is defined peripherally by the wrapper plate 26, the first effect half of the evaporator top plate 27, the bottom plate (53) of the second effect evaporator tube compartment 40, and the first effect half of the evaporator outer support plate 28, the evaporator inner support plate 44, the horizontal division wall plate 45, the end plates 30 and 31, the second effect evaporator tube compartment inner side wall (54), and external expansion joint and tube sheet details to be hereinafter more fully described.

The first effect evaporator vapor compartment 38 extends half the length of the casing 25 on the circular side of the upper half thereof. It is defined peripherally by the wrapper plate 26, the horizontal division wall plate 45, the evaporator inner support plate 44, the first effect shut-off plate 46 (see Fig. 6), the vertical division wall plate 47, the first effect end plate 30, and the vertical transverse division wall plate 48 (see Fig. 5).

The vapor feed heater compartment 39 extends full length of the casing 25 on the segment side of the upper half thereof. (See Figs. 6, 9, and 13.) It is defined peripherally by the upper end of the wrapper plate 26 over the first effect portion thereof, and by the vapor discharge compartment 42, bottom wall 49 over the second effect portion thereof (see Fig. 9), the feed heater outer wall plate 29, an upper portion longitudinally of the evaporator top plate 27, the second effect shut-off plate 50 (see Fig. 9) the vertical division wall plate 47, the end plates 30 and 31, the corner 51 of the vertical transverse division wall plate 48 (see Fig. 9) and the inner end wall 52 of the vapor discharge compartment 42 (see Fig. 13).

The second effect evaporator tube compartment 40 lies over the boiler compartment 37 on the segment side of the second effect half thereof. It is defined peripherally by its half of the evaporator top plate 27 and of the evaporator outer support plate 28, the bottom plate 53, its half of the evaporator inner support plate 44, the second effect end wall 31, the inner side wall 54 (see Fig. 13), and external expansion joint and tube sheet details to be hereinafter more fully described.

The second effect evaporator vapor compartment 41 extends half the length of the casing 25 on the circular side of the upper half thereof. It is defined peripherally by wrapper plate 26, the horizontal division wall plate 45, the evaporator inner support plate 44, the second effect shut-off plate 50, the vertical division wall plate 47, the second effect end plate 31, and the vertical transverse division wall plate 48.

The second effect evaporator vapor discharge compartment 42 lies over the second effect half of the vapor feed heater compartment 39. It is defined peripherally by a portion of the upper end of the wrapper plate 26, the feed heater outer wall plate 29, the bottom wall 49, the vertical division wall plate 47, the second effect end wall 31, and the inner end wall 52.

The boiler water gauge and vent communicating duct 43 is an auxiliary chamber of the boiler compartment 37 (see Fig. 6). It extends over the first effect half thereof and is separated therefrom by the evaporator top plate 27 but is communicated therewith by means of a plurality of orifices 55 in the intervening portion of the plate 27. The duct 43 is otherwise peripherally defined by the first effect shut-off plate 46, the vertical division wall plate 47, the first effect end plate 30, and the corner 51 of the transverse division wall plate 48.

The boiler compartment 37 comprises therewithin a fire tube boiler 56 for generating steam from fresh water, and a bank of first effect evaporating tubes 57 for evaporating salt water on the inside of the tubes 57 by the condensation of the steam generated by the boiler 56 on the outside of the tubes 57.

The fire tube boiler 56 comprises the oil burner and blower unit 58, the front fire and smoke box 59, the fire tube furnace flue 60, the back fire and smoke box 61, and the banks of fire tubes—second pass 62, third pass 63, and fourth pass 64. (See Figs. 3, 4, 5, 6 and 9.)

The oil burner and blower unit 58 is preferably a standard commercial pressure atomizing type of combined oil burner and motor driven blower for burning light diesel oil. However, arrangements can be made for burning almost any type of fuel oil or gas. The oil burner unit 58 is detachably mounted as by bolts (not shown) upon a support bracket (267) welded to the second effect end of the pedestal 24 and the outwardly extending front end of the fire tube furnace flue 60.

Figure 3:
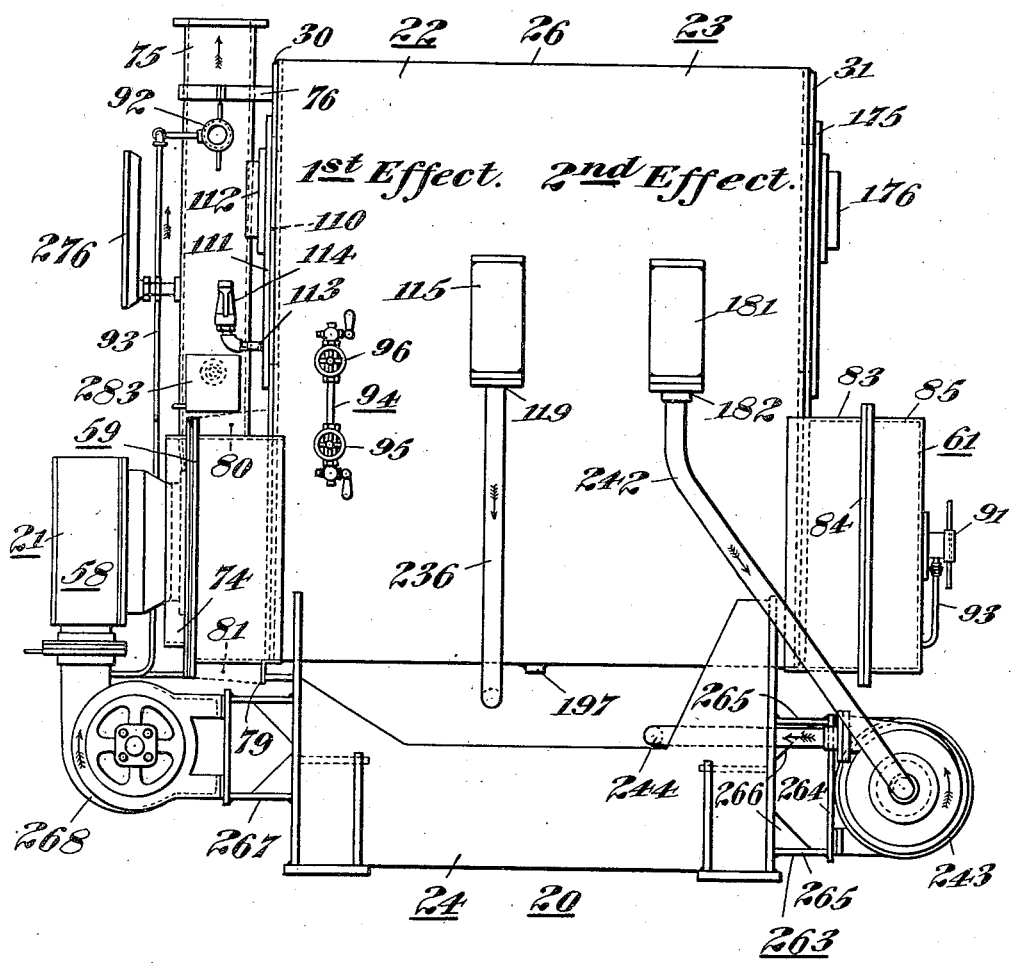
Fig. 3 is an opposite side elevation thereof.

The front fire and smoke box 59 (see Figs. 3, 4, 5, 7, 8, 10, 11, and 12) forms the fire-tight compartment 65 surrounding the outer front end of the flue 60, and a smaller smoke-tight compartment 66 extending above the said compartment 65 in the right half thereof. The compartment 65 communicates the front ends of the second and third passes banks of fire tubes 62 and 63 with each other. The compartment 66 communicates the front ends of the fourth pass bank of fire tubes 64 with the stack 75. The compartments 65 and 66 are peripherally defined by the wrapper plate 67 and division plate 68 welded to the first effect end plate 30 and to the front flange plate 69, and by the front end of the furnace flue 60 extending therethrough. The front flange plate 69 is welded to the end flange 70 of the furnace flue 60. A large opening 71 is provided in the left half of the front flange 69 opposite the front ends of the second pass fire tubes 62. Another large opening 72 is provided in the right half of the front flange plate 69 opposite the front ends of the third and fourth pass fire tubes 63 and 64. The openings 71 and 72 provide access for inspection and repair to the front ends of the respective fire tubes, and are normally closed by cover plates 73 and 74 removably attached to the front flange plate 69 as by cap screws (not shown). The compartment 66 is communicated with the atmosphere by means of the stack 75 welded to the wrapper plate 67 and to the front flange plate 69, and is supported at its upper end by a bracket 76 attached to the first effect end plate 30. Flange walls 77 and 78 welded respectively to the cover plates 73 and 74 provide means for supporting conventional insulating material. Flange 79 welded to the wrapper plate 67 is also provided to provide support for conventional insulating material as is indicated in Fig. 3 at 80.

The fire tube furnace flue 60 (see Fig. 5) extends through the fire compartment 65 and the boiler compartment 37 and is supported watertight in the first effect end plate 30 and in the second effect end plate 31 as by welding, and serves to communicate the oil burner and blower unit 58 with the back fire compartment 81.

The back fire and smoke box 61 (see Figs. 1, 2, 5, 7, and 8) comprises a fire-tight compartment 81 communicating the back end of the furnace flue 60 with the back ends of the second pass bank of fire tubes 62; and a smoke-tight compartment 82 communicating the back ends of the third and fourth passes banks of fire tubes 63 and 64 with each other. The compartments 81 and 82 are formed by a wrapper plate 83 welded to the second effect end plate 31. Welded to the outer edges of the wrapper plate 83 are the flanges 84 to serve as mounting means for the flanged cover plate 85. The flanged cover plate 85 is removably attached to the flanges 84 by suitable retaining means (such as bolts—not shown). The interior of the compartment 81 formed by the wrapper plate 83 is lined with plastic refractory 86 and asbestos sheet 88 attached by means of anchor devices 87. The interior of the flanged cover plate 85 is suitably lined with asbestos sheet material 88 and fire brick 89. A peephole 90 is provided through the cover plate 85 opposite the back end of the flue 60 and is equipped with a peep sight 91 through which combustion may be observed. The peep sight 91 may be removed and the opening 90 used for removing accumulated soot, etc. For further observation of smoking and incomplete combustion an illuminated smoke indicator 92 is installed in the stack 75. Both the peep sight 91 and the smoke indicator 92 are served by a small air line broadly designated as pipe line connections 93 is piped from the burner fan discharge. This air line 93 when in operation keeps the observation glasses clean by maintaining a current of air away from the observation glasses.

The banks of fire tubes 62, 63, and 64 are supported water-tight at their ends respectively in the first effect end plate 30 and the second effect end plate 31. The bank of fire tubes 62 communicates the back fire compartment 81 with the front fire compartment 65. The bank of fire tubes 63 communicates the front fire compartment 65 with the back smoke compartment 82. The bank of fire tubes 64 communicates the back smoke compartment 82 with the front smoke compartment 66.

Figure 4:
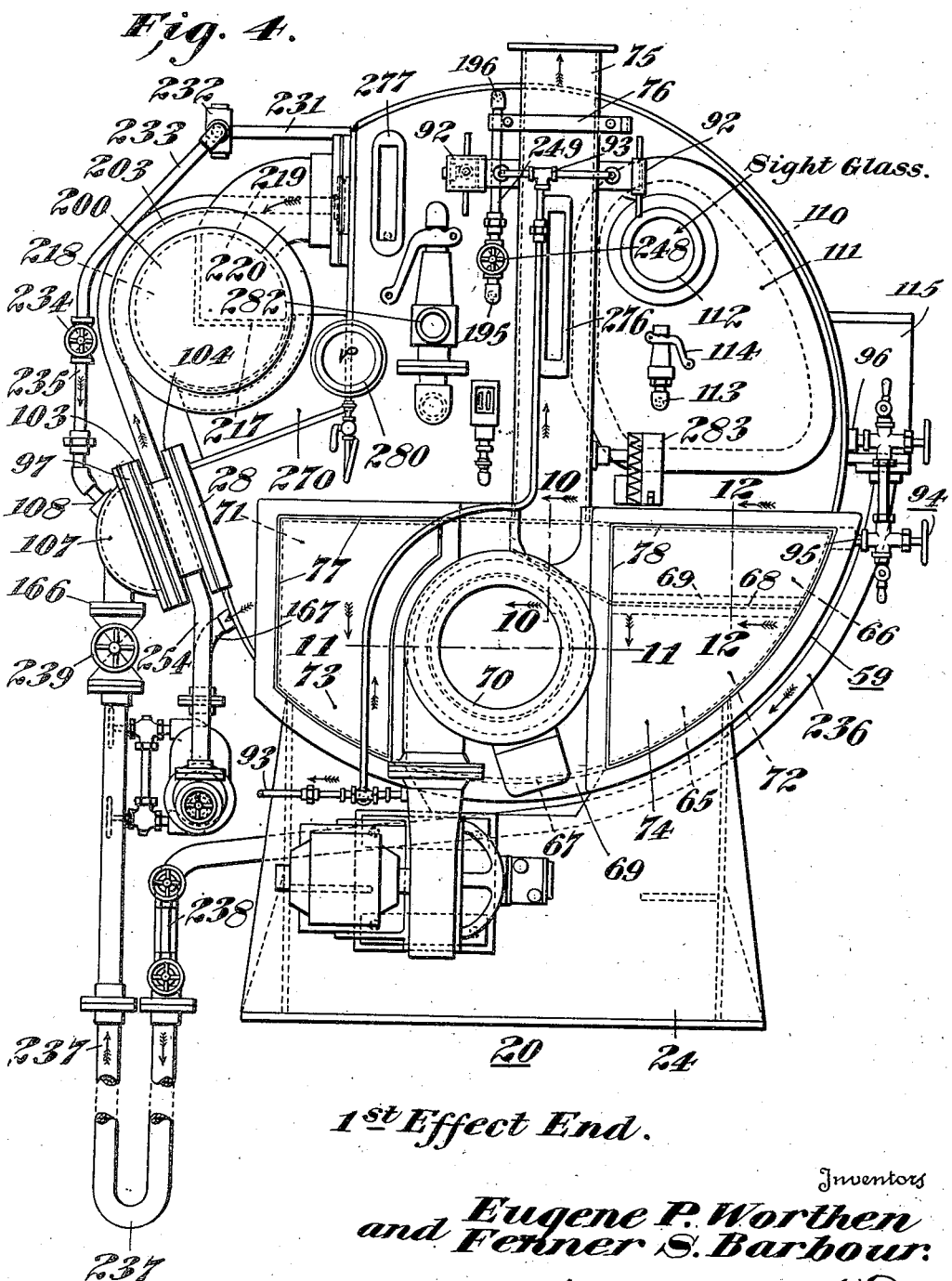
Fig. 4 is an elevation of the first effect end thereof.

A water gauge 94 is shown in Figs. 3 and 4, and its casing connections are shown in Fig. 9. The lower connection 95 communicates the below-water-line interior of the boiler compartment 37 with the lower end of the water gauge 94. The upper connection 96 passes water-tight through the first effect evaporator vapor compartment 38 to communicate the boiler water gauge and vent communicating duct 43 with the upper end of the water gauge 94.

The first effect bank of evaporating tubes 57 for evaporating salt or contaminated water on the inside thereof by the condensation of the steam generated by the boiler 56 on the outside thereof are supported water-tight at their lower outer ends in the first effect exterior evaporator tube sheet 97 and slope upwardly through the triangularly shaped pocket formed beneath the evaporator top plate 27 in the upper part of the first effect end of the boiler compartment 37, and are supported water-tight at their upper ends in the first effect interior evaporator tube sheet 98. An opening 99 is provided in the first effect half of the evaporator inner support plate 44 through which the tubes 57 extend. The tube sheet 98 and the inner support plate 44 are suitably adapted for retaining devices such as studs (not shown) whereby the tube sheet 98 is removably attached to the inner support plate 44. An opening 100 is provided in the first effect end of the evaporator outer support plate 28 through which the tubes 57 pass out of the boiler compartment 37. The lower ends of the tubes 57 together with their exterior tube sheet 97 are supported on the exterior face of the outer support plate 28 by means of the expansion joint 101. The expansion joint 101 provides a water-tight seal for the boiler compartment 37 between the opening 100 and the tube sheet 97, and at the same time provides for expansion and contraction of the tubes 57. The expansion joint 101 comprises the flanged joint 102, the tube sheet clamp flange 103, the support plate clamp flange 104, the support plate studs and nuts 105, and the tube sheet bolts 106. Attached to the exterior face of the tube sheet 97 by means of the bolts 106 is the first effect feed water head 107 provided with the feed water inlet connection 108 and the drain connection 109.

The first effect evaporator vapor compartment 38 (see Fig. 6), is provided with an opening 110 (see Figs. 4 and 9 for opening) in the first effect end plate 30 whereby access may be had to the interior thereof for the purpose of assembly, inspection, and repair. The opening 110 is normally closed by means of the flat cover plate 111 removably attached as by cap screws (not shown) to the first effect end plate 30 (see Figs. 3 and 4). The cover plate 111 is provided with a sight glass 112, and a tapped hole 113 for a relief valve 114. Attached water-tight to the wrapper plate 26 exteriorly of the first effect evaporator vapor compartment 38 is the level control box 115 (see Figs. 3 and 6). The level control box 115 comprises the wrapper plate 116, the top plate 117, the bottom plate 118, and the flanged level control pipe connection 119. The bottom plate 118 is provided with a clearance orifice 120 through which the pipe portion of the connection 119 projects upwardly into the interior of the level control box 115 when assembled in place. The bottom plate 118 and the exterior flange of the connection 119 is adapted for attaching elements such as cap screws (not shown) when assembled with the attaching flange of the discharge feed pipe to be hereinafter described. The height of the pipe 119 within the box 115 determines the level of the distilland within the first effect evaporator vapor compartment 38 when in operation—this by reason of vapor orifice 121 and water orifice 122 communicating the level control box 115 with the interior of the compartment 38. The first effect evaporator vapor compartment 38 is communicated with the vapor feed heater compartment 39 by means of an opening 123 in the upper portion of the vertical division wall plate 47 extending substantially the full length of the evaporator vapor compartment 38. Placed over and commanding the opening 123 and detachably mounted on the wall plate 47 by suitable retaining devices (such as studs—not shown) is the vapor separator 124. The vapor separator 124 is preferably a standard Bethlehem vapor separator of the type and design shown and disclosed in the co-pending patent application Serial No. 539,214, filed June 7, 1944, by Eugene Porter Worthen et al. As the details of this separator are not elements of invention in the subject matter of this present application it will not be further described herein—it is only necessary for the purpose of the present application that the vapor separator 124 be an efficient device for the removal of moisture containing salt from the vapors generated from the distilland in the evaporator vapor compartment 38, and to return this moisture to the said distilland, and to pass on for condensation to and within the vapor feed heater compartment 39 a maximum flow of the generated vapors so purified as to be within the permissible degree of salinity. The passageway 125 through the separator 124 is indicated conventionally by crossed dot-and-dash lines 125' in Figs. 5 and 13. In order to return the drainage from the separator to the body of the distilland below and beneath the surface thereof the separator 124 is provided with drainage pipe 126 and discharge cup 127.

The vapor feed heater compartment 39 contains the vapor feed heater unit 128. The vapor feed heater 128 is a unit removably attached by means of suitable fastening devices such as studs and nuts (not shown) to the outer face of the second effect plate 31 provided with an opening 129 through which the interior elements of the vapor feed heater unit 128 is assembled or withdrawn for inspection or repair. The vapor feed heater unit 128 comprises the outer tube sheet 130, which forms the attaching member and closing element for the opening 129, the outer conduit head 131, the tube sheet support plate 132, the tube sheet support plate tie rods 133 with nuts 134, the inner tube sheet 135, the inner conduit head 136, and the four sets of tubes 137, 138, 139, and 140, respectively.

The outer conduit head 131 (see Figs. 9 and 13) is preferably a casting removably attached by means of suitable fastening devices such as studs and nuts (not shown) to the outer tube sheet 130. The outer conduit head 131 is recessed and provided with two division walls 141 and 142 which form when the conduit head 131 is in place on the tube sheet 130 the chambers—lower 143, intermediate 144, and upper 145, the feed water inlet connection 146, and the feed water outlet connection 147. The inner conduit head 136 is of similar construction having the single division wall 148 forming the chambers 149 and 150 (see Fig. 13).

The respective ends of the tubes 137, 138, 139, and 140 are supported water-tight in the outer tube sheet 130 and the inner tube sheet 135.

Figure 13:
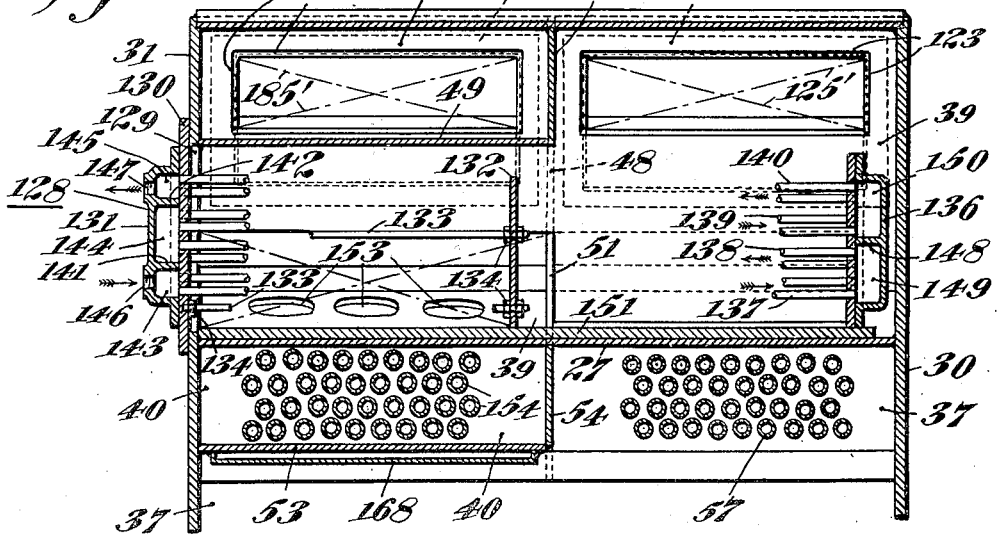
Fig. 13 is a detail section taken along the line 13—13—13 of Fig. 9 as viewed in the direction of the arrows.
Figure 14:
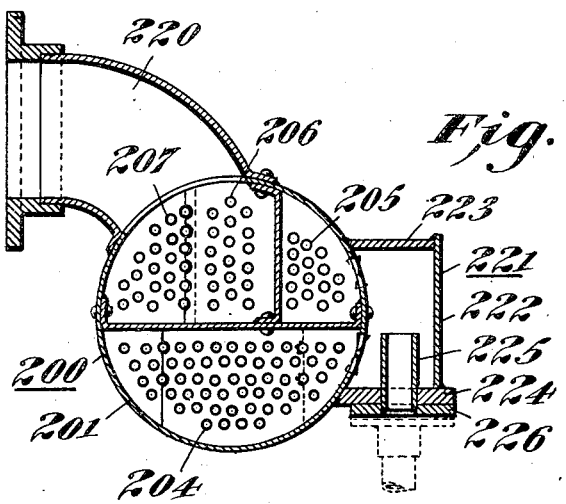
Fig. 14 is a detail section taken along the line 14—14—14—14 of Fig. 1 as viewed in the direction of the arrows.

It may now be noted particularly in Fig. 13, that the chamber 143 is communicated with the chamber 149 by means of the tubes 137; the chamber 149 is communicated with the chamber 144 by means of the tubes 138; the chamber 144 is communicated with the chamber 150 by means of the tubes 139; and the chamber 150 is communicated with the chamber 145 by means of the tubes 140.

For convenience in assembly and withdrawal of the vapor feed heater 128 the compartment 39 is provided with the bottom support guide 151 and the side guide 152, which support the inner weight of the heater unit 128 by contacting the bottom and side edges of the tube sheet support plate 132, of the inner tube sheet 135, and of the inner conduit head 136. (See Figs. 9 and 13.)

The vapor feed heater compartment 39 (see Figs. 9 and 13) is communicated with the second effect evaporator tube compartment 40 through the evaporator top plate 27 by means of the three orifices 153 for the discharge of vapor, and by means of the plurality of condensate drain orifices 153'; both in the lowermost corners respectively of the second effect half of the compartment 39 for the discharge of condensate—both vapor and condensate discharging to the second effect evaporator compartment 40.

The second effect evaporator tube compartment 40 (see Figs. 9 and 13) contains the bank of evaporating tubes 154 for evaporating salt or contaminated water on the inside thereof by the condensation of the residual steam from the vapor feed heater compartment 39 on the outside thereof. The said tubes 154 are supported water-tight at their lower outer ends in the second effect exterior evaporator tube sheet 155 and slope upwardly through the compartment 40 to be supported water-tight at their upper ends in the second effect interior evaporator tube sheet 156. An opening 157 is provided in the second effect half of the evaporator inner support plate 44 through which the tubes 154 extend. The tube sheet 156 and the inner support plate 44 are suitably adapted for retaining devices such as studs (not shown) whereby the tube sheet 156 is removably attached to the inner support plate 44. An opening 158 is provided in the second effect end of the evaporator outer support plate 28 through which the tubes 154 pass out of the evaporator tube compartment 40. The lower ends of the tubes 154 together with their exterior tube sheet 155 are supported on the exterior face of the outer support plate 28 by means of the expansion joint 159. The expansion joint 159 provides a water-tight seal for the second effect evaporator tube compartment 40 between the opening 158 and the tube sheet 155, and at the same time provides for expansion and contraction of the tubes 154. The expansion joint 159 comprises the flanged joint 160, the tube sheet clamp flange 161, the support plate clamp flange 162, the support plate studs and nuts 163, and the tube sheet bolts 164. Attached to the exterior face of the tube sheet 155 by means of the bolts 164 is the second effect feed water head 165 provided with the second effect feed water inlet pipe connection 166. The compartment 40 is provided with the condensate drain connection 167 near the lower edge of the bottom plate 53. An essential element of the evaporator tube compartment 40 is the insulating sheet 168 welded to the bottom of the bottom plate 53. The insulating sheet 168 is flanged at the edges and is spaced from the bottom plate 53 forming a dead air insulating space 169. Since the boiler extends the full length of the shell 25 considerable heat would normally pass through the horizontal division wall plate 45 of the second effect evaporator vapor compartment 41 and the bottom plate 53 of the second effect evaporator tube compartment 40 into the second effect with a resulting loss in efficiency due to by-passing the first effect. In order to minimize this loss as much as possible the insulating sheet 168 just described, and insulating sheet 188 hereinafter to be described have been provided. The insulating sheet 168 is provided, near a lower edge, with a single vapor vent hole 170. The compartment 40 is further provided with a tapped vent pipe connection 171 behind the outer support plate 28 in the second effect end plate 31 for a purpose to be further described hereinafter (see Figs. 2 and 9). The compartment 40 is provided with a tapped drain connection 172 in the lower edge of the tube sheet 155 for a pipe plug 173. (See Fig. 9.)

The second effect evaporator vapor compartment 41 (see Fig. 9) is provided with an opening 174 (see Figs. 2 and 6 for opening) in the second effect end plate 31 whereby access may be had to the interior thereof for the purpose of assembly, inspection, and repair. The opening 174 is normally closed by means of the flat cover plate 175 removably attached as by cap screws (not shown) to the second effect end plate 31 (see Fig. 2). The cover plate 175 is provided with a sight glass 176, a tapped hole 177 for a relief valve 178, and a tapped hole 179 for an air bleeder valve 180. Attached water-tight to the wrapper plate 26 exteriorly of the second effect evaporator vapor compartment 41 is the level control box 181 (see Fig. 3). The detail construction and purpose of the level control box 181 is similar to the level control box 115 for the first effect evaporator vapor compartment 38 and needs no further description than to designate its discharge brine pipe connection 182 to be further described hereinafter. The second effect evaporator vapor compartment 41 (see Fig. 9) is communicated with the second effect vapor discharge compartment 42 by means of an opening 183 in the upper portion of the vertical division wall plate 47 extending substantially full length of the compartment 41. Placed over and commanding the opening 183 and detachably mounted on the wall plate 47 by suitable retaining devices (such as studs—not shown) is the vapor separator 184. The vapor separator 184 is identical to the vapor separator 124 for the first effect and need not be further described than to designate the passageway 185 through the separator 184 and indicated by dot-and-dash lines 185' in Figs. 5 and 13, and the drain pipe 186 and discharge cup 187. An essential element of the second effect evaporator vapor compartment 41 is the insulating sheet 188 welded to the bottom of the horizontal division wall plate 45. It serves the same purpose as does the sheet 168 for the second effect evaporator tube compartment 40 having the dead air space 189, and vent hole 190, as has been described hereinbefore.

The second effect vapor discharge compartment 42 (see Fig. 9) is provided with inlet pipe connection 191 in the upper part of the second effect end plate 31. (See Fig. 2 for connection 191.) It is also provided with the outlet flange connection 192, and the inlet flanged connection 193 (see Fig. 1 for connections 192 and 193) in the outer wall plate 29 for the vapor discharge and condensate inlet respectively.

The boiler water gauge and vent communicating duct 43 is provided with the orifices 55 hereinbefore designated, the pipe connection 194 (see Fig. 9) for connection 194 in the first effect shut-off plate 46 for the upper gauge pipe connection 96, and the discharge vent pipe connection 195 in the first effect end plate 30 (see Fig. 4). A companion inlet pipe connection 196 in the first effect end plate 30 communicates with the vapor feed heater compartment 39.

We now come to the various units attached to the exterior of the casing 25 and forming cooperative connecting links and essential elements in the complete evaporating and distilling unit 20. Because of the conventional nature of these connecting links and essential elements in operation it will be convenient to describe these briefly along with a statement of the normal operation of the apparatus. It will be convenient to refer now more particularly to the Figures 1 to 4, inclusive, and, in order to more readily follow the flow systems of the liquids to be distilled, the heating means and fluids therefore, and the condensate collecting means it will also be convenient to refer to Figure 15 wherein the flow systems are shown diagrammatically. With respect to the latter drawing it is to be understood, that due to the limitations of a diagrammatic drawing, structural relationships must be further studied from the Figures 1 to 14, inclusive.

In preparation for use the boiler compartment 37 will be filled through the filling and drain pipe connection 197 (see Figs. 3 and 5) with pure water to a level somewhat above the top row of tubes as will be indicated on the boiler water gauge 94. Since the boiler operates under a closed system, when in operation, the water is used over and over again and no make-up feed water is required. This results in the elimination of the usual boiler feed pump, controls, and piping, and also in the elimination of tube scaling due to impurities in the feed water.

In operation sea or other circulating water to be evaporated and distilled enters the apparatus 20 from the source of supply by way of the pipe 198 (see Figs. 1 and 2) leading to the flanged pipe connection 199 of the combined condenser and condensate cooler 200.

The combined condenser and condensate cooler 200 (see Figs. 1, 2, and 14) is a conventional type of heat interchanger in which the feed water passes tortuously through a series of nests of tubes over and around which heated condensate and vapors pass on the exterior surfaces thereof, thus extracting heat from the condensate and vapors and adding it to the feed water. As the specific details of this combined condenser and condensate cooler are not elements of invention in the subject matter of this present application it will not be described in complete detail—it is only necessary for the purpose of the present application to describe its general operating features. The combined condenser and condensate cooler 200 (see Figures 1, 2, and 14) comprises preferably a cylindrical shell container 201 having the recessed front head 202 and the recessed rear head 203, and the nests of tubes 204, 205, 206, and 207. The nests of tubes are supported water-tight at their respective ends conventionally in the front tube sheet 208 and in the rear tube sheet 209 bolted respectively between the front head 202 and rear head 203 and their respective flanged ends of the container 201. The front head 202 is provided with the feed water inlet flanged pipe connection 199, the circulating water discharge flanged pipe connection 210, the feed water discharge tapped pipe connection 211, the horizontal recess rib 212, and the vertical recess rib 213. By reason of the ribs 212 and 213 there is formed over the adjacent tube sheet 208 the chambers 214, 215, and 216. The rear head 203 is provided with the angular rib 217 forming over the adjacent tube sheet 209 the chambers 218 and 219. The shell container 201 is also provided with a condensate and vapor flanged inlet connection 220, and level control box 221. The level control box 221 is attached water-tight to the exterior of the shell container 201 and comprises the wrapper plate 222, the top plate 223, the bottom plate 224, the level control pipe 225, and the flanged outlet connection 226. It will now be readily understood that the feed water entering the combined condenser and condensate cooler 200 traverses sequentially the following circulating conduit elements therein: chamber 214, nest of tubes 204, chamber 218, nest of tubes 205, chamber 215, nest of tubes 206, chamber 219, nest of tubes 207, and chamber 216. In passing through the lower set of tubes 204 the circulating water serves as a condensate heat exchange medium—in passing through the upper series of tubes 205, 206, and 207 the circulating water serves as a distilling condenser heat exchange medium. In leaving the chamber 216 the circulating water having served its purpose as a heat exchange medium in its passage through the unit 200 is divided—a portion is diverted through the outlet connection 211 to serve as feed water to be evaporated and distilled while the remainder is discharged to waste overboard through the outlet connection 210, valve 227, pipe line connections 228, and pipe 229. The water diverted through the outlet connection 211 continues onward by way of pipe line connections 230 to the inlet pipe connection 146 in the outer conduit head 131 of the vapor feed heater unit 128. In next passing through the vapor feed heater unit 128 the circulating water traverses sequentially the following circulating conduit elements therein: chamber 143, tubes 137, chamber 149, tubes 138, chamber 144, tubes 139, chamber 150, tubes 140, chamber 145, and outlet pipe connection 147. In leaving the vapor feed heater unit 128 the circulating water has again served as a heat exchange medium—has acted as a cooling agent for, and has absorbed heat from, the vapors within the vapor feed heater compartment 39 surrounding the vapor feed heater unit 128.

The circulating water emerges from the vapor feed heater unit 128 from outlet pipe connection 147 and flows by way of pipe line connections 231, feed flow meter 232, pipe line connection 233, feed control valve 234, pipe connections 235, to discharge through the feed water inlet connection 108 in the feed water head 107 of the first effect evaporating tubes 57. No feed pump is required since the pressure in the circulating water discharge line is maintained at a greater pressure than that existing in the evaporator chamber 38 in communication with the tubes 57.

When the feed water enters the feed water head 107 it rises in the evaporator tubes 57 and overflows from their upper ends into the first effect evaporator vapor compartment 38. The feed water then rises in the compartment 38 until it reaches the top of pipe portion of the connection 119 and the excess water then discharges therethrough as hereinafter described.

When the circulating water enters the evaporator tubes 57 and compartment 38 it becomes the distilland for the apparatus 20. The system of level control and the supply of distilland used in the present apparatus 20 utilizes the basic principles of operation and the basic instrumentalities therefor shown and described in the co-pending patent application Serial No. 441,184, filed April 30, 1942, by Eugene Porter Worthen. The basic instrumentalities herein are the feed control valve 234 and the level control devices 115 and 181 hereinbefore described together with certain pipe connections herein next to be set forth. Briefly, this system of level control and supply of the distilland for the apparatus 20 comprises controlling the operating rate of flow of the distilling liquid to the first effect evaporating vapor compartment 38 of the apparatus 20 in constant substantial excess of that removed by evaporation within the apparatus as a whole, and further comprises, for each effect 22 and 23, having on their respective outlet conduits a level control device as hereinbefore described. The level control device in each case operates to receive the excess flow of liquid from its respective effect evaporating vapor compartment and to maintain the lquid level therein regardless of the operating rate of liquid flow thereto, and to pass the excess liquid on to the next succeeding effect compartment, or in the case of the last effect compartment to discharge the final excess overboard.

The outlet level control pipe connection 119 of the first effect compartment 38 is communicated with the second effect feed water inlet pipe connection 166 on the feed water head 165 of the second effect evaporating tubes 154 by means of the pipe line connections 236, loop seal pipe connections 237, with water gauge 238, and valve 239. The loop seal pipe connections 237 is provided in our preferred arrangement of sufficient depth to help maintain the desired pressure differential between the first effect and the second effect. In normal operation this is determined by having the preferred vacuum in the first effect vapor compartment 38 approximately 16" Hg, while that maintained in the second effect combined condenser and condensate cooler 200 is approximately 24" Hg. Furthermore we prefer to insert a feed water distribution baffle 240 with diffusion orifices 241 in the inlet connection 166 of the feed water head 165 in order to more evenly distribute the water to all the tube ends therewithin.

When the feed water enters the second effect feed water head 165 it rises in the evaporator tubes 154 and overflows from their upper ends into the second effect evaporator vapor compartment 41. Here, similarly as in compartment 38 for the first effect, the water rises until it reaches the top of the discharge brine pipe connection 182 and then the residual excess brine discharges therethrough to waste overboard by way of pipe line connections 242, pump 243, pipe line connections 244, check valve 245, pipe line connection 247, and pipe 229.

With the boiler compartment 37 filled, and feed water flowing through the apparatus 20 and discharging overboard, the fire tube boiler 21 is put into operation by starting the blower and burner unit 58. The oil burner fires into the fire tube furnace flue 60. The hot gases emerging from the back end of the furnace flue 60 enter and transverse the fire box compartment 81, and are here directed to enter and traverse the bank of fire tubes 62 to the front end thereof, to enter and traverse the fire compartment 65, and are here directed to enter and traverse the bank of fire tubes 63 to the rear end thereof, to enter and traverse the smoke compartment 82, and are here directed to enter and traverse the bank of fire tubes 64 to the front end thereof, to enter and traverse the smoke compartment 66, and thence to the atmosphere by way of the stack 75.

As a result of the circulation of the hot gases of combustion through the furnace and fire tubes as just described, the water within the boiler compartment 37 absorbs the heat on the outside of the tubes and generates steam. The generated steam rises to the upper reaches of the boiler compartment 37 occupied by the sloping first effect evaporating tubes 57 and surrounding the exposed surfaces thereof, condenses thereon, and gives up its latent heat to the feed water inside the evaporating tubes 57, causing it to boil. The resultant mixture of water and vapor within the tubes 57 is discharged from the upper ends thereof into the first effect evaporator vapor compartment 38, while the water condensed on the outside of the tubes 57 falls back into the boiler compartment 26 to be regenerated over and over again.

When the apparatus is first put into use after a shut-down, a small diameter air bleeder valve 180 provided in the tapped hole 179 in cover plate 175 is opened and communicates the atmosphere with the second effect vapor compartment 41 for the purpose of preventing the air and condensate pump (260) from pulling a vacuum too quickly, thereby causing violent flashing within the evaporating vapor chambers with a consequent carry-over of brine into the combined distilling condenser and condensate cooler 200.

It is also desirable occasionally, when the apparatus is in operation, to vent the boiler compartment to the first effect shell in order to prevent air from blanking off the boiler evaporator surface—this is provided for by the valve 248 and pipe line connections 249 communicating the discharge vent pipe connection 195 from the boiler water gauge and vent communicating duct 43 with the inlet vent pipe connection 196 of the vapor feed heater compartment 39—both connections being in the first effect end plate 30 (see Fig. 4).

The vapor discharged from the first effect evaporator tubes 57 rises to the upper confines of the first effect evaporator vapor compartment 38 and is drawn through the separator 124 and opening 123 in the vertical division wall plate 47 into the vapor feed heater compartment 39. In passing through the separator 124 the vapor gives up its entrained water which is returned through the drain pipe 126 and discharge cup 127 to the body of unevaporated water in the lower part of the first effect evaporator vapor compartment 38.

The vapor entering the compartment 38 is drawn first downwards over the first effect ends of the vapor feed heater nests of tubes 137, 138, 139, and 140, and then horizontally towards the second effect ends thereof, and thus circulating therethrough is partially condensed. The uncondensed vapor is next drawn downwards through the orifices 153 into the second effect evaporator tube compartment 40, while the condensate drains thereto through the orifices 153'.

The heated vapor and condensate discharged into the second effect evaporator tube compartment 40 surrounds the exposed surfaces of the second effect evaporator tubes 154 and condenses thereon giving up its latent heat to the feed water inside the tubes 154 causing it to boil. The resultant mixture of water and vapor within the tubes 154 is discharged from the upper ends thereof into the second effect evaporator vapor compartment 41 while the water condensed on the outside of the tubes 154 falls to the bottom end of the compartment 40 and is discharged through the condensate drain connection 167.

The condensate emerges from the drain connection 167 and flows by means of the pipe connection 250, drain regulator 251, pipe 252, valve 253, pipe line connections 254, and condensate inlet 193 in the outer wall plate 29, to discharge into the second effect evaporator vapor discharge compartment 42. Within the compartment 42, and opposite the inlet opening of the connection 193, a small baffle 255 is provided to prevent the incoming condensate from blowing back into the separator 184. The purpose of the drain regulator is merely to seal the second effect tube nest to prevent steam from blowing through the tube nest and discharging with the drains.

In order to maintain proper steam circulation near the lower end of the evaporator tubes 154 within the compartment 40 the tapped vent pipe connection 171 is communicated with the vent inlet pipe connection 191, communicating with the compartment 42, by means of the line of pipe connections 256 and valve 257.

The vapor discharged from the second effect evaporator tubes 154 rises to the upper confines of the second effect evaporator vapor compartment 41 and is drawn through the separator 184 and the opening 183 in the vertical division wall plate 47 into the second effect evaporator vapor discharge compartment 42 where it joins the condensate discharged from the second effect evaporator chamber 40 by way of the line of pipe connections 254.

The combined vapor and condensate is drawn from the compartment 42 by way of the outlet flange connection 192, and flanged inlet connection 220 to the interior of the combined distilling condenser and condensate cooler 200 where the vapor is further condensed and the condensate is sub-cooled. The condensate rises in the condensate cooler portion to the height of the level control pipe 225. The level control pipe 225 is designed to discharge uncondensed vapor and gases together with condensate simultaneously from the unit 200 and to mix them thoroughly in the discharge pipe line connection 258 communicating the flanged outlet connection 226 with the inlet connection 259 of the air and condensate pump 260. The pump 260 discharges through the discharge connection 261 to condensate storage tanks (not shown).

It will be noted that the brine pump 243 and the air and condensate pump 260 are driven by a single motor 262 mounted in line with and between the pumps as a combined unit upon the second effect end of the pedestal 24 on a welded support bracket 263. The support bracket 263 comprises a mounting plate 264, standard plates 265, and angle brackets 266 welded to each other and to the pedestal 24 (see Figure 3). The mounting plate 264 is adapted for boltholes for mounting bolts (not shown). A similarly constructed support bracket 267 is provided on the first effect end of the pedestal 24 for mounting the fan and motor unit 268 of the oil burner and blower unit 58 (see Figs. 3 and 4).

The apparatus 20 is provided with a number of operating accessories not hereinbefore set forth—they will now be noted briefly.

A salinity cell 269 is mounted on the condensate drain regulator 251. The salinity cell is used to give a continuous indication of the salinity of the condensate flowing through the drain regulator 251.

Figure 2:
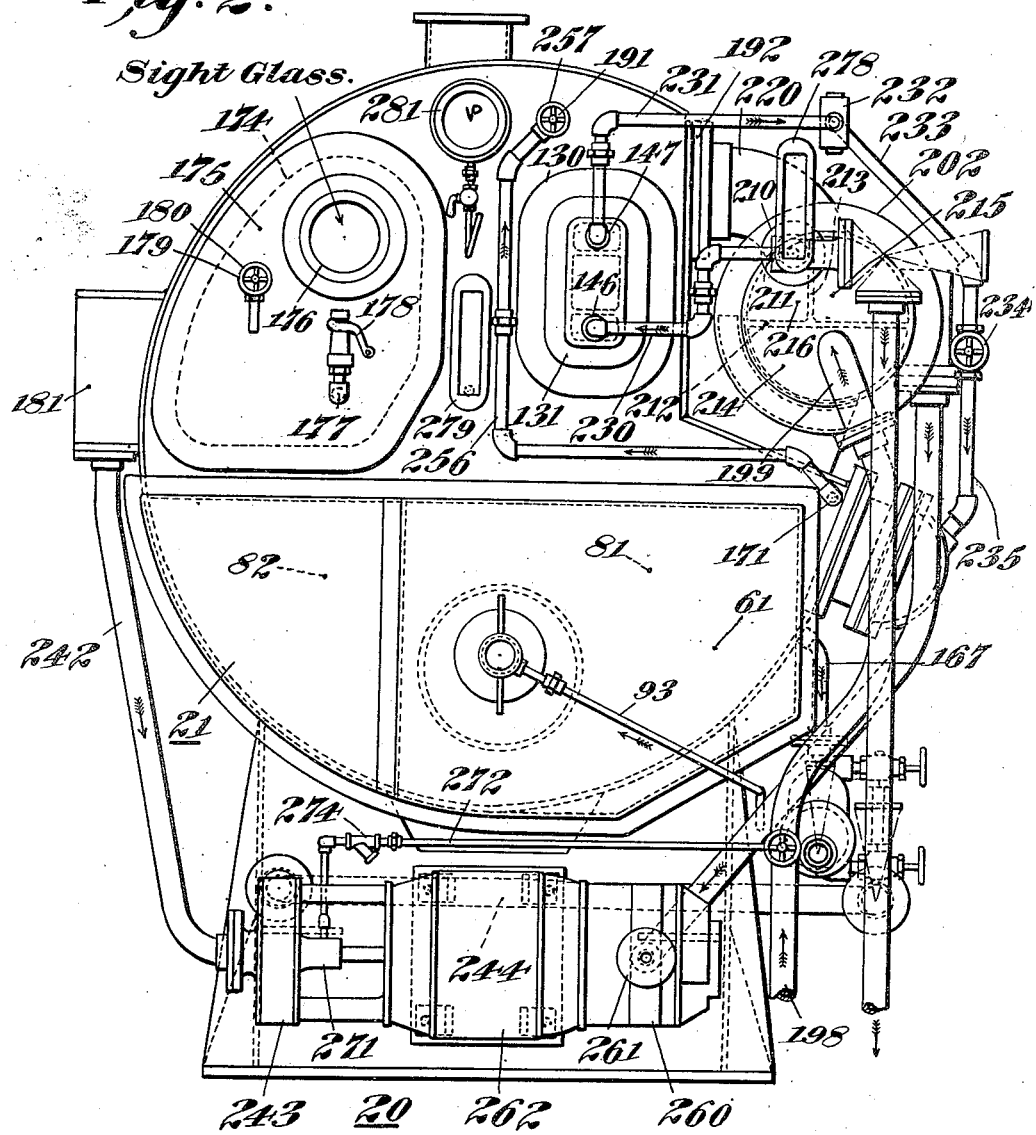
Fig. 2 is an elevation of the second effect end thereof.

The combined condenser and condensate cooler unit 200 is preferably attached to the casing 25 by means of paired plate brackets 270 welded conjointly to the evaporator top plate 27 and to the feed heater outer wall plate 29 of the casing 25, and to the cylindrical shell container 201 of the unit 200 (see Figs. 1 and 2).

The shaft bearing 271 of the brine pump 243 is provided with a liquid seal by means of pipe line connections 272 communicating with the feed water inlet pipe 198 at the discharge connection 273 therein. The pipe line connections 272 include a strainer 274 and a valve 275.

Thermometers are provided as follows: Stack thermometer 276 on stack 75 (see Figs. 3 and 4). Vapor feed heater compartment 39 thermometer 277 (see Fig. 4). Feed water thermometer 278 in pipe line 230 (see Fig. 2). Boiler compartment 37 thermometer 279 (see Fig. 2).

Pressure gauges are provided as follows: Boiler compartment 37 pressure gauge 280 (see Fig. 4). Second effect evaporator vapor compartment 41 pressure gauge 281 (see Fig. 2).

Boiler safety valve 282 is provided for the boiler compartment 37 (see Fig. 4).

An oil burner master control 283 is mounted on the stack 75 (see Figs. 3 and 4).

Although we have described and illustrated our invention in considerable detail, we do not wish to be limited to the exact and specific details thereof as shown and described, but may use such modifications in, substitution for, or equivalent thereof, as are embraced within the scope of our invention or as pointed out in the claims.

Having thus described our invention, what we claim as new and desire to secure by Letters Patent is:

1. In apparatus for evaporating and distilling liquids, a housing structure comprising a boiler adapted to contain a body of water operatively hermetically sealed therein and comprising a fluid fuel burner and a stack outlet mounted exteriorly thereof, a plurality of fire tubes disposed below the level of said body of water and communicating said burner with said stack outlet, and means for firing said burner whereby heat and products of combustion may pass from said burner to said stack outlet in heat exchange relation with said body of water whereby vapor is generated therefrom, a first distilling effect comprising a first compartment, and a second distilling effect comprising a second compartment, a first condenser chamber connected to receive vapor from said first compartment, a second condenser chamber connected to receive vapor from said second compartment, conduit means for conducting liquid to be distilled successively in heat exchanging relation with vapor in the second condenser chamber, with vapor in the first condenser chamber, and with the vapor generated in said boiler enclosure whereby the said vapors are condensed and some of the liquid in said conduit is evaporated and the vapor thereof is discharged along with the remaining liquid therein into said first compartment, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated and the vapor thereof is discharged along with the remaining liquid therein into said second compartment, means for collecting for use condensates from said heater chamber and from said second condenser chamber, vapor exhausting means communicating with said second condenser chamber, and brine discharge means communicating with said second compartment.

2. In apparatus for evaporating and distilling liquids, a housing structure and a separate heat exchange unit mounted thereon, the housing structure comprising a boiler adapted to contain a body of water operatively hermetically sealed therein and comprising a fluid fuel burner and a stack outlet mounted exteriorly thereof, a plurality of fire tubes disposed below the level of said body of water and communicating said burner with said stack outlet, and means for firing said burner whereby heat and products of combustion may pass from said burner to said stack outlet in heat exchange relation with said body of water whereby vapor is generated therefrom, a first distilling effect comprising a first compartment, and a second distilling effect comprising a second compartment, a first condenser chamber connected to receive vapor from said first compartment, a vapor discharge chamber connected to receive vapor from said second compartment, conduit means for conducting liquid to be distilled successively in heat exchanging relation with vapor in said heat exchange unit, with vapor in the first condenser chamber, and with the vapor generated in said boiler enclosure whereby the said vapors are condensed and some of the liquid in said conduit is evaporated and the vapor thereof is discharged along with the remaining liquid therein into said first compartment, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated and the vapor thereof is discharged along with the remaining liquid therein into second compartment, conduit means for conducting condensate and vapor from said vapor discharge chamber into said heat exchange unit, combined vapor and condensate exhausting means communicating with said heat exchange unit, and brine discharge means communicating with said second compartment.

3. In apparatus for evaporating and distilling liquids, a housing structure comprising a single container shell and external reenforcing and supporting elements therefor, the said shell being divided by longitudinal transverse walls into a lower boiler enclosure and an upper first and second effect evaporating and distilling enclosure, that portion of said walls separating said boiler enclosure from the second effect portion of the evaporating and distilling enclosure comprising insulating elements whereby direct heat exchange to said second effect is minimized thereby, the said boiler enclosure being adapted to contain a body of water operatively hermetically sealed therein and comprising a fluid fuel burner and a stack outlet mounted exteriorly thereof, a plurality of fire tubes disposed below the level of said body of water and communicating said burner with said stack outlet, and means for firing said burner whereby heat and products of combustion may pass from said burner to said stack outlet in heat exchanging relation with said body of water whereby vapor is generated therefrom, the said first and second effect evaporating and distilling enclosure comprising a first compartment, a second compartment, a first condenser chamber connected to receive vapor from said first compartment, a second condenser chamber connected to receive vapor from said second compartment, conduit means for conducting liquid to be distilled successively in heat exchanging relation with vapor in the second condenser chamber, with vapor in the first condenser chamber, and with the vapor generated in said boiler enclosure whereby the said vapors are condensed and some of the liquid in said conduit is evaporated and the vapor thereof is discharged along with the remaining liquid therein into said first compartment, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated and the vapor thereof is discharged along with the remaining liquid therein into said second compartment, means for collecting for use condensates from said heater chamber and from said second condenser chamber, vapor exhausting means communicating with said second condenser chamber, and brine discharge means communicating with said second compartment.

4. In apparatus for evaporating and distilling liquids, a housing structure comprising a single container shell and external reenforcing and supporting elements therefor, the said shell being divided by longitudinal transverse walls into a lower boiler enclosure and an upper first and second effect evaporating and distilling enclosure, the said boiler enclosure being adapted to contain a body of water operatively hermetically sealed therein and comprising a fluid fuel burner and a stack outlet mounted exteriorly thereof, a plurality of fire tubes disposed below the level of said body of water and communicating said burner with said stack outlet, and means for firing said burner whereby heat and products of combustion may pass from said burner to said stack outlet in heat exchanging relation with said body of water whereby vapor is generated therefrom, the said first and second effect evaporating and distilling enclosure comprising a first compartment, a second compartment, a first condenser chamber connected to receive vapor from said first compartment, a second condenser chamber connected to receive vapor from said second compartment, conduit means for conducting liquid to be distilled successively in heat exchanging relation with vapor in the second condenser chamber, with vapor in the first condenser chamber, and with the vapor generated in said boiler enclosure whereby the said vapors are condensed and some of the liquid in said conduit is evaporated therein, that portion of said conduit means engaging the vapor generated in said boiler enclosure being comprised of a plurality of inter-communicated transversely disposed water tubes sloping upwardly through the upper reaches of the first effect end of said boiler enclosure to communicate with and to discharge their contents of vapor and liquid into said first compartment, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated therein, that portion of said last mentioned conduit means engaging the vapor in said heater chamber being comprised of a plurality of inter-communicated transversely disposed water tubes sloping upwardly through the said heater chamber to communicate with and to discharge their contents of vapor and liquid into said second compartment, means for collecting for use condensates from said heater chamber and from said second condenser chamber, vapor exhausting means communicating with said second condenser chamber, and brine discharge means communicating with said second compartment.

5. In apparatus for evaporating and distilling liquids, a housing structure and a separate heat exchange unit mounted thereon, the housing structure comprising a single container shell and external reenforcing and supporting elements therefor, the said shell being divided by longitudinal transverse walls into a lower boiler enclosure and an upper first and second effect evaporating and distilling enclosure, that portion of said walls separating said boiler enclosure from the second effect portion of the evaporating and distilling enclosure comprising insulating elements whereby direct heat exchange to said second effect is minimized thereby, the said boiler enclosure being adapted to contain a body of water operatively hermetically sealed therein and comprising a fluid fuel burner and a stack outlet mounted exteriorly thereof, a plurality of fire tubes disposed below the level of said body of water and communicating said burner with said stack outlet, and means for firing said burner whereby heat and products of combustion may pass from said burner to said stack outlet in heat exchanging relation with said body of water whereby vapor is generated therefrom, the said first and second effect evaporating and distilling enclosure comprising a first compartment, a second compartment, a first condenser chamber connected to receive vapor from said first compartment, a vapor discharge chamber connected to receive vapor from said second compartment, conduit means for conducting liquid to be distilled successively in heat exchanging relation with vapor in said heat exchange unit, with vapor in the first condenser chamber, and with the vapor generated in said boiler enclosure whereby the said vapors are condensed and some of the liquid in said conduit is evaporated and the vapor thereof is discharged along with the remaining liquid therein into said first compartment, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated and the vapor thereof is discharged along with the remaining liquid therein into said second compartment, conduit means for conducting condensate and vapor from said vapor discharge chamber into said heat exchange unit, combined vapor and condensate exhausting means communicating with said heat exchange unit, and brine discharge means communicating with said second compartment.

6. In apparatus for evaporating and distilling liquids, a housing structure comprising a single container shell and external reenforcing and supporting elements therefor, the said shell being divided by longitudinal transverse walls into a lower boiler enclosure and an upper first and second effect evaporating and distilling enclosure, that portion of said walls separating said boiler enclosure from the second effect portion of the evaporating and distilling enclosure comprising insulating elements whereby direct heat exchange to said second effect is minimized thereby, the said boiler enclosure being adapted to contain a body of water operatively hermetically sealed therein and comprising a fluid fuel burner and a stack outlet mounted exteriorly thereof, a plurality of fire tubes disposed below the level of said body of water and communicating said burner with said stack outlet, and means for firing said burner whereby heat and products of combustion may pass from said burner to said stack outlet in heat exchanging relation with said body of water whereby vapor is generated therefrom, the said first and second effect evaporating and distilling enclosure comprising a first compartment, a second compartment, a first condenser chamber connected to receive vapor from said first compartment, a second condenser chamber connected to receive vapor from said second compartment, conduit means for conducting liquid to be distilled successively in heat exchanging relation with vapor in the second condenser chamber, with vapor in the first condenser chamber, and with the vapor generated in said boiler enclosure whereby the said vapors are condensed and some of the liquid in said conduit is evaporated therein, that portion of said conduit means engaging the vapor generated in said boiler enclosure being comprised of a plurality of inter-communicated transversely disposed water tubes sloping upwardly through the upper reaches of the first effect end of said boiler enclosure to communicate with and to discharge their contents of vapor and liquid into said first compartment, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated therein, that portion of said last mentioned conduit means engaging the vapor in said heater chamber being comprised of a plurality of inter-communicated transversely disposed water tubes sloping upwardly through the said heater chamber to communicate with and to discharge their contents of vapor and liquid into said second compartment, means for collecting for use condensates from said heater chamber and from said second condenser chamber, vapor exhausting means communicating with said second condenser chamber, and brine discharge means communicating with said second compartment.

7. In apparatus for evaporating and distilling liquids, a housing structure and a separate heat exchange unit mounted thereon, the housing structure comprising a single container shell and external reenforcing and supporting elements therefor, the said shell being divided by longitudinal transverse walls into a lower boiler enclosure and an upper first and second effect evaporating and distilling enclosure, that portion of said walls separating said boiler enclosure from the second effect portion of the evaporating and distilling enclosure comprising insulating elements whereby direct heat exchange to said second effect is minimized thereby, the said boiler enclosure being adapted to contain a body of water operatively hermetically sealed therein and comprising a fluid fuel burner and a stack outlet mounted exteriorly thereof, a plurality of fire tubes disposed below the level of said body of water and communicating said burner with said stack outlet, and means for firing said burner whereby heat and products of combustion may pass from said burner to said stack outlet in heat exchanging relation with said body of water whereby vapor is generated therefrom, the said first and second effect evaporating and distilling enclosure comprising a first compartment, a second compartment, a first condenser chamber connected to receive vapor from said first compartment, a vapor discharge chamber connected to receive vapor from said second compartment, conduit means for conducting liquid to be distilled successively in heat exchanging relation with vapor in said heat exchange unit, with vapor in the first condenser chamber, and with the vapor generated in said boiler enclosure whereby the said vapors are condensed and some of the liquid in said conduit is evaporated therein, that portion of said conduit means engaging the vapor generated in said boiler enclosure being comprised of a plurality of inter-communicated transversely disposed water tubes sloping upwardly through the upper reaches of the first effect end of said boiler enclosure to communicate with and to discharge their contents of vapor and liquid into said first compartment, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated therein, that portion of said last mentioned conduit means engaging the vapor in said heater chamber being comprised of a plurality of inter-communicated transversely disposed water tubes sloping upwardly through the said heater chamber to communicate with and to discharge their contents of vapor and liquid into said second compartment, conduit means for conducting condensate and vapor from said vapor discharge chamber into said heat exchange unit, combined vapor and condensate exhausting means communicating with said heat exchange unit, and brine discharge means communicating with said second compartment.

8. In apparatus for evaporating and distilling liquids, a housing structure comprising a single container shell and external reenforcing and supporting elements therefor, the said shell being divided by longitudinal transverse walls into a lower boiler enclosure and an upper plural effect evaporating and distilling enclosure, the said boiler enclosure being adapted to contain a body of water operatively hermetically sealed therein and comprising a fluid fuel burner and a stack outlet mounted exteriorly thereof, a plurality of fire tubes disposed below the level of said body of water and communicating said burner with said stack outlet, and means for firing said burner whereby heat and products of combustion may pass from said burner to said stack outlet in heat exchange relation with said body of water whereby vapor is generated therefrom, the said plural effect evaporating and distilling enclosure comprising a first compartment, a second compartment, a first condenser chamber connected to receive vapor from said first compartment, a second condenser chamber connected to receive vapor from said second compartment, conduit means for conducting liquid to be distilled successively in heat exchanging relation with vapor in the second condenser chamber, with vapor in the first condenser chamber, and with the vapor generated in said boiler enclosure whereby the said vapors are condensed and some of the liquid in said conduit is evaporated and the vapor thereof is discharged along with the remaining liquid therein into said first compartment, said conduit comprising means to control the operating rate of flow of said liquid to said first compartment in constant substantial excess of that removed by evaporation in said apparatus, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated and the vapor thereof is discharged along with the remaining liquid therein into said second compartment and comprising means for maintaining the liquid level in said first compartment regardless of the operating rate of liquid flow and a restraining means for said liquid flow, means for collecting for use condensates from said heater chamber and from said second condenser chamber, vapor exhausting means communicating with said second condenser chamber, and a conduit system for discharging excess brine from said second compartment comprising means for maintaining the liquid level in said second compartment regardless of the operating rate of liquid flow therefrom.

9. In apparatus for evaporating and distilling liquids, a housing structure and a separate heat exchange unit mounted thereon, the housing structure comprising a single container shell and external reenforcing and supporting elements therefor, the said shell being divided by longitudinal transverse walls into a lower boiler enclosure and an upper plural effect evaporating and distilling enclosure, the said boiler enclosure being adapted to contain a body of water operatively hermetically sealed therein and comprising a fluid fuel burner and a stack outlet mounted exteriorly thereof, a plurality of fire tubes disposed below the level of said body of water and communicating said burner with said stack outlet, and means for firing said burner whereby heat and products of combustion may pass from said burner to said stack outlet in heat exchange relation with said body of water whereby vapor is generated therefrom, the said plural effect evaporating and distilling enclosure comprising a first compartment, a second compartment, a first condenser chamber connected to receive vapor from said first compartment, a vapor discharge chamber connected to receive vapor from said second compartment, conduit means for conducting liquid to be distilled successively in heat exchanging relation with vapor in said heat exchange unit, with vapor in the first condenser chamber, and with the vapor generated in said boiler enclosure whereby the said vapors are condensed and some of the liquid in said conduit is evaporated and the vapor thereof is discharged along with the remaining liquid therein into said first compartment, said conduit comprising means to control the operating rate of flow of said liquid to said first compartment in constant substantial excess of that removed by evaporation in said apparatus, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated and the vapor thereof is discharged along with the remaining liquid therein into said second compartment and comprising means for maintaining the liquid level in said first compartment regardless of the operating rate of liquid flow and a restraining means for said liquid flow, conduit means for conducting condensate from said heater chamber into said vapor discharge chamber, conduit means for conducting condensate and vapor from said vapor discharge chamber into said heat exchange unit, combined vapor and condensate exhausting means communicating with said heat exchange unit, and a conduit system for discharging excess brine from said second compartment comprising means for maintaining the liquid level in said second compartment regardless of the operating rate of liquid flow therefrom.

10. In apparatus for evaporating and distilling liquids, a housing structure comprising a single container shell and external reenforcing and supporting elements therefor, the said shell being divided by longitudinal transverse walls into a lower boiler enclosure and an upper first and second effect evaporating and distilling enclosure, that portion of said walls separating said boiler enclosure from the second effect portion of the evaporating and distilling enclosure comprising insulating elements whereby direct heat exchange to said second effect is minimized thereby, the said boiler enclosure being adapted to contain a body of water operatively hermetically sealed therein and comprising a fluid fuel burner and a stack outlet mounted exteriorly thereof, a plurality of fire tubes disposed below the level of said body of water and communicating said burner with said stack outlet, and means for firing said burner whereby heat and products of combustion may pass from said burner to said stack outlet in heat exchanging relation with said body of water whereby vapor is generated therefrom, the said first and second effect evaporating and distilling enclosure comprising a first compartment, a second compartment, a first condenser chamber connected to receive vapor from said first compartment, a second condenser chamber connected to receive vapor from said second compartment, conduit means for conducting liquid to be distilled successively in heat exchanging relation with vapor in the second condenser chamber, with vapor in the first condenser chamber, and with the vapor generated in said boiler enclosure whereby the said vapors are condensed and some of the liquid in said conduit is evaporated and the vapor thereof is discharged along with the remaining liquid therein into said first compartment, said conduit comprising means to control the operating rate of flow of said liquid to said first compartment in constant substantial excess of that removed by evaporation in said apparatus, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated and the vapor thereof is discharged along with the remaining liquid therein into said second compartment and comprising means for maintaining the liquid level in said first compartment regardless of the operating rate of liquid flow and a restraining means for said liquid flow, means for collecting for use condensates from said heater chamber and from said second condenser chamber, vapor exhausting means communicating with said second condenser chamber, and a conduit system for discharging excess brine from said second compartment comprising means for maintaining the liquid level in said second compartment regardless of the operating rate of liquid flow therefrom.

11. In apparatus for evaporating and distilling liquids, a housing structure comprising a single container shell and external reenforcing and supporting elements therefor, the said shell being divided by longitudinal transverse walls into a lower boiler enclosure and an upper plural effect evaporating and distilling enclosure, the said boiler enclosure being adapted to contain a body of water operatively hermetically sealed therein and comprising a fluid fuel burner, a fire vestibule, a stack vestibule and outlet mounted exteriorly at one end thereof, and a combustion vestibule and a smoke vestibule mounted exteriorly at the opposite end thereof, a relatively large combustion tube extending longitudinally through said fire vestibule and said boiler enclosure below the water level thereof and communicating said burner with said combustion vestibule, a plurality of smaller fire tubes extending longitudinally through said boiler enclosure below the water level thereof, a portion of said smaller fire tubes communicating said combustion vestibule with said fire vestibule, a second portion of said smaller fire tubes communicating said fire vestibule with said smoke vestibule, and the remaining of said smaller fire tubes communicating said smoke vestibule with said stack vestibule, and means for firing said burner whereby heat and products of combustion may pass in tortuous passage from said burner to said stack outlet in heat exchanging relation with said body of water whereby vapor is generated therefrom, the said plural effect evaporating and distilling enclosure comprising a first compartment, a second compartment, a first condenser chamber connected to receive vapor from said first compartment, a second condenser chamber connected to receive vapor from said second compartment, conduit means for conducting liquid to be distilled successively in heat exchanging relation with vapor in the second condenser chamber, with vapor in the first condenser chamber, and with the vapor generated in said boiler enclosure whereby the said vapors are condensed and some of the liquid in said conduit is evaporated and the vapor thereof is discharged along with the remaining liquid therein into said first compartment, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated and the vapor thereof is discharged along with the remaining liquid therein into said second compartment, means for collecting for use condensates from said heater chamber and from said second condenser chamber, vapor exhausting means communicating with said second condenser chamber, and brine discharge means communicating with said second compartment.

12. In apparatus for evaporating and distilling liquids, a housing structure and a separate heat exchange unit mounted thereon, the housing structure comprising a single container shell and external reenforcing and supporting elements therefor, the said shell being divided by longitudinal transverse walls into a lower boiler enclosure and an upper plural effect evaporating and distilling enclosure, the said boiler enclosure being adapted to contain a body of water operatively hermetically sealed therein and comprising a fluid fuel burner, a fire vestibule, a stack vestibule and outlet mounted exteriorly at one end thereof, and a combustion vestibule and a smoke vestibule mounted exteriorly at the opposite end thereof, a relatively large combustion tube extending longitudinally through said fire vestibule and said boiler enclosure below the water level thereof and communicating said burner with said combustion vestibule, a plurality of smaller fire tubes extending longitudinally through said boiler enclosure below the water level thereof, a portion of said smaller fire tubes communicating said combustion vestibule with said fire vestibule, a second portion of said smaller fire tubes communicating said fire vestibule with said smoke vestibule, and the remaining of said smaller fire tubes communicating said smoke vestibule with said stack vestibule, and means for firing said burner whereby heat and products of combustion may pass in tortuous passage from said burner to said stack outlet in heat exchanging relation with said body of water whereby vapor is generated therefrom, the said plural effect evaporating and distilling enclosure comprising a first compartment, a second compartment, a first condenser chamber connected to receive vapor from said first compartment, a vapor discharge chamber connected to receive vapor from said second compartment, conduit means for conducting liquid to be distilled successively in heat exchanging relation with vapor in said heat exchange unit, with vapor in the first condenser chamber, and with the vapor generated in said boiler enclosure whereby the said vapors are condensed and some of the liquid in said conduit is evaporated and the vapor thereof is discharged along with the remaining liquid therein into said first compartment, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated and the vapor thereof is discharged along with the remaining liquid therein into said second compartment, conduit means for conducting condensate from said heater chamber into said vapor discharge chamber, conduit means for conducting condensate and vapor from said vapor discharge chamber into said heat exchange unit, combined vapor and condensate exhausting means communicating with said heat exchange unit, and brine discharge means communicating with said second compartment.

13. In apparatus for evaporating and distilling liquids, a housing structure comprising a single container shell and external reenforcing and supporting elements therefor, the said shell being divided by longitudinal transverse walls into a lower boiler enclosure and an upper first and second effect evaporating and distilling enclosure, that portion of said walls separating said boiler enclosure from the second effect portion of the evaporating and distilling enclosure comprising insulating elements whereby direct heat exchange to said second effect is minimized thereby, the said boiler enclosure being adapted to contain a body of water operatively hermetically sealed therein and comprising a fluid fuel burner, a fire vestibule, a stack vestibule and outlet mounted exteriorly at one end thereof, and a combustion vestibule and a smoke vestibule mounted exteriorly at the opposite end thereof, a relatively large combustion tube extending longitudinally through said fire vestibule and said boiler enclosure below the water level thereof and communicating said burner with said combustion vestibule, a plurality of smaller fire tubes extending longitudinally through said boiler enclosure below the water level thereof, a portion of said smaller fire tubes communicating said combustion vestibule with said fire vestibule, a second portion of said smaller fire tubes communicating said fire vestibule with said smoke vestibule, and the remaining of said smaller fire tubes communicating said smoke vestibule with said stack vestibule, and means for firing said burner whereby heat and products of combustion may pass in tortuous passage from said burner to said stack outlet in heat exchanging relation with said body of water whereby vapor is generated therefrom, the said first and second effect evaporating and distilling enclosure comprising a first compartment, a second compartment, a first condenser chamber connected to receive vapor from said first compartment, a second condenser chamber connected to receive vapor from said second compartment, conduit means for conducting liquid to be distilled successively in heat exchanging relation with vapor in the second condenser chamber, with vapor in the first condenser chamber, and with the vapor generated in said boiler enclosure whereby the said vapors are condensed and some of the liquid in said conduit is evaporated and the vapor thereof is discharged along with the remaining liquid therein into said first compartment, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated and the vapor thereof is discharged along with the remaining liquid therein into said second compartment, means for collecting for use condensates from said heater chamber and from said condenser chamber, vapor exhausting means communicating with said second condenser chamber, and brine discharge means communicating with said second compartment.

14. In apparatus for evaporating and distilling liquids, a housing structure comprising a single container shell and external reenforcing and supporting elements therefor, the said shell being divided by longitudinal transverse walls into a lower boiler enclosure and an upper plural effect evaporating and distilling enclosure, the said boiler enclosure being adapted to contain a body of water operatively hermetically sealed therein and comprising a fluid fuel burner, a fire vestibule, a stack vestibule and outlet mounted exteriorly at one end thereof, and a combustion vestibule and a smoke vestibule mounted exteriorly at the opposite end thereof, a relatively large combustion tube extending longitudinally through said fire vestibule and said boiler enclosure below the water level thereof and communicating said burner with said combustion vestibule, a plurality of smaller fire tubes extending longitudinally through said boiler enclosure below the water level thereof, a portion of said smaller fire tubes communicating said combustion vestibule with said fire vestibule, a second portion of said smaller fire tubes communicating said fire vestibule with said smoke vestibule, and the remaining of said smaller fire tubes communicating said smoke vestibule with said stack vestibule, and means for firing said burner whereby heat and products of combustion may pass in tortuous passage from said burner to said stack outlet in heat exchanging relation with said body of water whereby vapor is generated therefrom, the said plural effect evaporating and distilling enclosure comprising a first compartment, a second compartment, a first condenser chamber connected to receive vapor from said first compartment, a second condenser chamber connected to receive vapor from said second compartment, conduit means for conducting liquid to be distilled successively in heat exchanging relation with vapor in the second condenser chamber, with vapor in the first condenser chamber, and with the vapor generated in said boiler enclosure whereby the said vapors are condensed and some of the liquid in said conduit is evaporated and the vapor thereof is discharged along with the remaining liquid therein into said first compartment, said conduit comprising means to control the operating rate of flow of said liquid to said first compartment in constant substantial excess of that removed by evaporation in said apparatus, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated and the vapor thereof is discharged along with the remaining liquid therein into said second compartment and comprising means for maintaining the liquid level in said first compartment regardless of the operating rate of liquid flow and a restraining means for said liquid flow, means for collecting for use condensates from said heater chamber and from said second condenser chamber, vapor exhausting means communicating with said second condenser chamber, and a conduit system for discharging excess brine from said second compartment comprising means for maintaining the liquid level in said second compartment regardless of the operating rate of liquid flow therefrom.

15. In apparatus for evaporating and distilling liquids, a housing structure and a separate combined condensate cooler and distilling condenser mounted thereon, the housing structure comprising a single container shell and external reenforcing and supporting elements therefor, the said shell being divided by longitudinal transverse walls into a lower boiler enclosure and an upper plural effect evaporating and distilling enclosure, the said boiler enclosure being adapted to contain a body of water operatively hermetically sealed therein and comprising a fluid fuel burner, a fire vestibule, a stack vestibule and outlet mounted exteriorly at one end thereof, and a combustion vestibule and a smoke vestibule mounted exteriorly at the opposite end thereof, a relatively large combustion tube extending longitudinally through said fire vestibule and said boiler enclosure below the water level thereof and communicating said burner with said combustion vestibule, a plurality of smaller fire tubes extending longitudinally through said boiler enclosure below the water level thereof, a portion of said smaller fire tubes communicating said combustion vestibule with said fire vestibule, a second portion of said smaller fire tubes communicating said fire vestibule with said smoke vestibule, and the remaining of said smaller fire tubes communicating said smoke vestibule with said stack vestibule, and means for firing said burner whereby heat and products of combustion may pass in tortuous passage from said burner to said stack outlet in heat exchanging relation with said body of water whereby vapor is generated therefrom, the said plural effect evaporating and distilling enclosure comprising a first compartment, a second compartment, a first condenser chamber connected to receive vapor from said first compartment, a vapor discharge chamber connected to receive vapor from said second compartment, conduit means for conducting liquid to be distilled successively in heat exchanging relation with vapor in the combined condensate cooler and distilling condenser, with vapor in the first condenser chamber, and with the vapor generated in said boiler enclosure whereby the said vapors are condensed and some of the liquid in said conduit is evaporated and the vapor thereof is discharged along with the remaining liquid therein into said first compartment, said conduit comprising means to control the operating rate of flow of said liquid to said first compartment in constant substantial excess of that removed by evaporation in said apparatus, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated and the vapor thereof is discharged along with the remaining liquid therein into said second compartment and comprising means for maintaining the liquid level in said first compartment regardless of the operating rate of liquid flow and a restraining means for said liquid flow, conduit means for conducting condensate from said heater chamber into said vapor discharge chamber, conduit means for conducting condensate and vapor from said vapor discharge chamber into said combined condensate cooler and distilling condenser, combined vapor and condensate exhausting means communicating with said combined condensate cooler and distilling condenser, and a conduit system for discharging excess brine from said second compartment comprising means for maintaining the liquid level in said second compartment regardless of the operating rate of liquid flow therefrom.

16. In apparatus for evaporating and distilling liquids, a housing structure comprising a single container shell and external reenforcing and supporting elements therefor, the said shell being divided by longitudinal transverse walls into a lower boiler enclosure and an upper first and second effect evaporating and distilling enclosure, that portion of said walls separating said boiler enclosure from the second effect portion of the evaporating and distilling enclosure comprising insulating elements whereby direct heat exchange to said second effect is minimized thereby, the said boiler enclosure being adapted to contain a body of water operatively hermetically sealed therein and comprising a fluid fuel burner, a fire vestibule, a stack vestibule and outlet mounted exteriorly at one end thereof, and a combustion vestibule and a smoke vestibule mounted exteriorly at the opposite end thereof, a relatively large combustion tube extending longitudinally through said fire vestibule and said boiler enclosure below the water level thereof and communicating said burner with said combustion vestibule, a plurality of smaller fire tubes extending longitudinally through said boiler enclosure below the water level thereof, a portion of said smaller fire tubes communicating said combustion vestibule with said fire vestibule, a second portion of said smaller fire tubes communicating said fire vestibule with said smoke vestibule, and the remaining of said smaller fire tubes communicating said smoke vestibule with said stack vestibule, and means for firing said burner whereby heat and products of combustion may pass in tortuous passage from said burner to said stack outlet in heat exchanging relation with said body of water whereby vapor is generated therefrom, the said first and second effect evaporating and distilling enclosure comprising a first compartment, a second compartment, a first condenser chamber connected to receive vapor from said first compartment, a second condenser chamber connected to receive vapor from said second compartment, conduit means for conducting liquid to be distilled successively in heat exchanging relation with vapor in the second condenser chamber, with vapor in the first condenser chamber, and with the vapor generated in said boiler enclosure whereby the said vapors are condensed and some of the liquid in said conduit is evaporated and the vapor thereof is discharged along with the remaining liquid therein into said first compartment, said conduit comprising means to control the operating rate of flow of said liquid to said first compartment in constant substantial excess of that removed by evaporation in said apparatus, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated and the vapor thereof is discharged along with the remaining liquid therein into said second compartment and comprising means for maintaining the liquid level in said first compartment regardless of the operating rate of liquid flow and a restraining means for said liquid flow, means for collecting for use condensates from said heater chamber and from said second condenser chamber, vapor exhausting means communicating with said second condenser chamber, and a conduit system for discharging excess brine from said second compartment comprising means for maintaining the liquid level in said second compartment regardless of the operating rate of liquid flow therefrom.

17. In apparatus for evaporating and distilling liquids, a housing structure and a separate combined condensate cooler and distilling condenser mounted thereon, the housing structure comprising a single container shell and external reenforcing and supporting elements therefor, the said shell being divided by longitudinal transverse walls into a lower boiler enclosure and an upper first and second effect evaporating and distilling enclosure, that portion of said walls separating said boiler enclosure from the second effect portion of the evaporating and distilling enclosure comprising insulating elements whereby direct heat exchange to said second effect is minimized thereby, the said boiler enclosure being adapted to contain a body of water operatively hermetically sealed therein and comprising a fluid fuel burner, a fire vestibule, a stack vestibule and outlet mounted exteriorly at one end thereof, and a combustion vestibule and a smoke vestibule mounted exteriorly at the opposite end thereof, a relatively large combustion tube extending longitudinally through said fire vestibule and said boiler enclosure below the water level thereof and communicating said burner with said combustion vestibule, a plurality of smaller fire tubes extending longitudinally through said boiler enclosure below the water level thereof, a portion of said smaller fire tubes communicating said combustion vestibule with said fire vestibule, a second portion of said smaller fire tubes communicating said fire vestibule with said smoke vestibule, and the remaining of said smaller fire tubes communicating said smoke vestibule with said stack vestibule, and means for firing said burner whereby heat and products of combustion may pass in tortuous passage from said burner to said stack outlet in heat exchanging relation with said body of water whereby vapor is generated therefrom, the said first and second effect evaporating and distilling enclosure comprising a first compartment, a second compartment, a first condenser chamber connected to receive vapor from said first compartment, a vapor discharge chamber connected to receive vapor from said second compartment, conduit means for conducting liquid to be distilled successively in heat exchanging relation with vapor in the combined condensate cooler and distilling condenser, with vapor in the first condenser chamber, and with the vapor generated in said boiler enclosure whereby the said vapors are condensed and some of the liquid in said conduit is evaporated and the vapor thereof is discharged along with the remaining liquid therein into said first compartment, said conduit comprising means to control the operating rate of flow of said liquid to said first compartment in constant substantial excess of that removed by evaporation in said apparatus, a heater chamber connected to receive condensate and vapor from said first condenser chamber, conduit means for conducting excess liquid from said first compartment into heat exchanging relation with vapor in said heater chamber whereby the said vapor is condensed and some of the liquid in said conduit is evaporated and the vapor thereof is discharged along with the remaining liquid therein into said second compartment and comprising means for maintaining the liquid level in said first compartment regardless of the operating rate of liquid flow and a restraining means for said liquid flow, conduit means for conducting condensate from said heater chamber into said vapor discharge chamber, conduit means for conducting condensate and vapor from said vapor discharge chamber into said combined condensate cooler and distilling condenser, combined vapor and condensate exhausting means communicating with said combined condensate cooler and distilling condenser, and a conduit system for discharging excess brine from said second compartment comprising means for maintaining the liquid level in said second compartment regardless of the operating rate of liquid flow therefrom.

EUGENE PORTER WORTHEN.
FENNER SMITH BARBOUR.